US012714036B2

(12) United States Patent
Uematsu et al.

(10) Patent No.: US 12,714,036 B2
(45) Date of Patent: Aug. 25, 2026

(54) BUILDING

(71) Applicant: KABUSHIKI KAISHA KOBE SEIKO SHO (KOBE STEEL, LTD.), Hyogo (JP)

(72) Inventors: Koji Uematsu, Kobe (JP); Akio Sugimoto, Kobe (JP); Hiroki Okada, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 305 days.

(21) Appl. No.: 18/683,466

(22) PCT Filed: Jun. 9, 2022

(86) PCT No.: PCT/JP2022/023328
§ 371 (c)(1),
(2) Date: Feb. 13, 2024

(87) PCT Pub. No.: WO2023/021816
PCT Pub. Date: Feb. 23, 2023

(65) Prior Publication Data

US 2024/0349659 A1 Oct. 24, 2024

(30) Foreign Application Priority Data

Aug. 17, 2021 (JP) ................................ 2021-132884
Mar. 24, 2022 (JP) ................................ 2022-048867

(51) Int. Cl.
*A01G 9/24* (2006.01)
*E04B 1/76* (2006.01)
(Continued)

(52) U.S. Cl.
CPC ................ *A01G 9/245* (2013.01); *E04B 1/76* (2013.01); *F24D 11/007* (2013.01); *E04B 1/0023* (2013.01)

(58) Field of Classification Search
CPC ......... A04G 9/245; E04B 1/0023; E04B 1/76; F24D 11/007
(Continued)

(56) References Cited

U.S. PATENT DOCUMENTS 4,098,262 A * 7/1978 Peters .................... F24S 20/67 126/647
4,295,415 A 10/1981 Schneider, Jr.
(Continued)

FOREIGN PATENT DOCUMENTS

CN 107691040 A 2/2018
DE 15 09 678 A1 2/1969
(Continued)

OTHER PUBLICATIONS

International Search Report issued in PCT/JP2022/023328; mailed Aug. 9, 2022.
(Continued)

*Primary Examiner* — James J Buckle, Jr.
(74) *Attorney, Agent, or Firm* — Studebaker Brackett PLLC

(57) ABSTRACT

A building includes at least one structural member. The structural member includes a light-receiving surface that is formed by extrusion or casting of a metal and is irradiated with sunlight, a structural member main body in which a hollow portion extending from a first end portion toward a second end portion is formed, a pair of lid portions that are respectively disposed at the first end portion and the second end portion, and close the hollow portion, an inlet that is provided in any one of the pair of lid portions and through which a heating medium flows into the hollow portion, and an outlet that is provided in any one of the pair of lid portions and through which the heating medium flows out from the hollow portion.

20 Claims, 20 Drawing Sheets

(51) Int. Cl.
*F24D 11/00* (2022.01)
*E04B 1/00* (2006.01)

(58) Field of Classification Search
USPC .......................................................... 52/302.3
See application file for complete search history.

(56) References Cited

U.S. PATENT DOCUMENTS

| | | | | |
|---|---|---|---|---|
| 4,498,526 | A * | 2/1985 | Arenas | F24D 11/007 165/45 |
| 4,509,502 | A * | 4/1985 | Youcha | F24S 10/75 126/675 |
| 4,519,383 | A * | 5/1985 | Larkin | F24D 11/007 126/633 |
| 4,529,123 | A * | 7/1985 | Johnson | A01G 9/245 126/92 AC |
| 4,611,576 | A * | 9/1986 | Stephens | F24S 23/30 126/609 |
| 5,259,363 | A | 11/1993 | Peacock et al. | |
| 6,837,236 | B1 * | 1/2005 | Lichtenberger | F24D 17/0021 126/634 |
| 11,486,608 | B2 * | 11/2022 | Nakamura | F25B 49/043 |
| 12,429,250 | B2 * | 9/2025 | Uematsu | F24S 10/70 |
| 2009/0126717 | A1 * | 5/2009 | Nass | F24S 70/60 126/666 |
| 2011/0192393 | A1 * | 8/2011 | Swift | F24S 10/501 126/663 |
| 2017/0023277 | A1 * | 1/2017 | Petursson | F24S 80/453 |
| 2021/0270470 | A1 * | 9/2021 | Plinke | F24D 11/007 |

FOREIGN PATENT DOCUMENTS

| | | | |
|---|---|---|---|
| JP | S50-117054 | U | 9/1975 |
| JP | S55-003519 | A | 1/1980 |
| JP | S58-057652 | U | 4/1983 |
| JP | S61-1953 | A | 1/1986 |
| JP | H10-253169 | A | 9/1998 |
| JP | 2001-037348 | A | 2/2001 |
| JP | 2011-010624 | A | 1/2011 |
| JP | 2012-242016 | A | 12/2012 |
| JP | 2019-122271 | A | 7/2019 |
| WO | 03/085329 | A1 | 10/2003 |
| WO | 2009/044623 | A1 | 4/2009 |

OTHER PUBLICATIONS

The extended European search report issued by the European Patent Office on Sep. 6, 2024, which corresponds to European Patent Application No. 22858140.1-1105 and is related to U.S. Appl. No. 18/683,466.

International Preliminary Report on Patentability and Written Opinion issued in PCT/JP2022/023328; mailed Feb. 29, 2024.

* cited by examiner 1
2
10a
10b
10c
10d
64
65
80A
80B
81
82A
82B
83
VIII
Z
Y
X
N 1
Z
X
42
43
58
59
60
con.
61
62
63a
63b
63c
64
65
66a
66b
66c
66d
66e
66f
80A
80B
81
82A
82B
P
T

BUILDING

TECHNICAL FIELD

The present invention relates to a building.

BACKGROUND ART

A building installed with a heat collecting member that stores heat obtained by sunlight in a heating medium is known. Patent Literature 1 discloses an agricultural greenhouse installed with a heat collecting member. During the day, the heating medium heated by irradiating the heat collecting member with sunlight circulates in the agricultural greenhouse at night to warm the air in the agricultural greenhouse.

PRIOR ART DOCUMENT

Patent Document

Patent Document 1: JP-A-2019-122271

SUMMARY OF THE INVENTION

Problems to be Solved by the Invention

In the agricultural greenhouse disclosed in Patent Document 1, since the panel-type heat collecting member is disposed in the upper space in the agricultural greenhouse, a decrease and unevenness in the solar radiation amount in the agricultural greenhouse occur. Photosynthesis of crops cultivated in the agricultural greenhouse is thus suppressed due to the decrease and unevenness in the solar radiation amount, and there is a risk of affecting the growth and yield of the crops.

The present invention provides a building that collects heat from sunlight while suppressing an increase in a shadow generation range which is also a cause of a decrease and unevenness in the solar radiation amount in an agricultural greenhouse.

Solutions to the Problems

The present invention provides a building including at least one structural member, the structural member including a structural member main body that is formed by extrusion or casting of a metal, includes a light-receiving surface irradiated with sunlight, and is internally formed with a hollow portion extending from a first end portion toward a second end portion, a pair of lid portions that are respectively disposed at the first end portion and the second end portion, and close the hollow portion, an inlet that is provided in any one of the pair of lid portions and through which a heating medium flows into the hollow portion, and an outlet that is provided in any one of the pair of lid portions and through which the heating medium flows out from the hollow portion.

According to the building of the present invention, sunlight incident on the light-receiving surface of the structural member main body is converted into heat in the structural member main body, and the heat can be stored in the heating medium. That is, heat can be collected from sunlight in the structural member. Here, the structural member is a member necessary for a building to be constructed in a certain structure and for the structure to be maintained. For example, the agricultural greenhouse is constructed such that the configuration other than the structural member and a transparent sheet is minimized in order to secure the light amount in the agricultural greenhouse. In other words, in the agricultural greenhouse, it is not desirable to provide a configuration other than the structural member and the transparent sheet because the solar radiation amount is reduced. In the present invention, since heat can be collected from sunlight in the structural member, installation of other heat collecting members can be suppressed, and a decrease in the solar radiation amount in the agricultural greenhouse can be suppressed.

The hollow portion may include a first flow channel through which the heating medium flows from the first end portion toward the second end portion, and a second flow channel that is disposed so as to be adjacent to the first flow channel with a partition wall interposed between the first flow channel and the second flow channel and through which the heating medium flows from the second end portion toward the first end portion.

According to the above configuration, since the hollow portion includes two flow channels, the flow channel through which the heating medium flows becomes long, and the area where the structural member main body and the heating medium are in contact with each other can be increased. Therefore, the heat of the structural member main body heated by sunlight can be efficiently transferred to the heating medium.

Each of the pair of lid portions may be provided with a connection flow channel connecting the first flow channel and the second flow channel such that the heating medium flows in a meandering manner from the inlet toward the outlet.

According to the above configuration, since the heating medium flows in a meandering manner, it is possible to secure a large area where the structural member main body and the heating medium are in contact with each other. In addition, the time during which the structural member main body and the heating medium are in contact with each other can be long. Therefore, heat from sunlight can be efficiently stored in the heating medium. In addition, by processing the lid portion and providing the connection flow channel, a flow channel in which the heating medium flows in a meandering manner can be formed. Therefore, processing for forming the meandering flow channel in the structural member main body is not required, and the structural member main body can be easily manufactured.

The partition wall may be provided with a liquid passage hole connecting the first flow channel and the second flow channel such that the heating medium flows in a meandering manner from the inlet toward the outlet.

According to the above configuration, since the heating medium flows in a meandering manner, it is possible to secure a large area where the structural member main body and the heating medium are in contact with each other. In addition, the time during which the structural member main body and the heating medium are in contact with each other can be long. Therefore, heat from sunlight can be efficiently stored in the heating medium. In addition, by processing the structural member main body and providing the liquid passage hole, a flow channel in which the heating medium flows in a meandering manner can be formed. Therefore, processing for forming the meandering flow channel is not required for the lid portion, and the lid portion can be easily manufactured.

The hollow portion may include a plurality of first flow channels disposed so as to be adjacent to each other with a partition wall interposed between the plurality of first flow channels and through which the heating medium flows from the first end portion toward the second end portion.

According to the above configuration, since the heating medium flows in one direction through the plurality of first flow channels, a flow rate can be ensured.

Each of the pair of lid portions may be provided with a common flow channel communicating with each of opening ends of the plurality of first flow channels such that the heating medium is delivered from the inlet to the plurality of first flow channels, and the heating medium merges from the plurality of first flow channels and flows toward the outlet.

According to the above configuration, it is possible to easily realize a structure for securing the flow rate of the heating medium using the plurality of first flow channels.

The structural member main body may include a recess provided at the first end portion and the second end portion and allowing end portions of the plurality of first flow channels to communicate with each other, and each of the pair of lid portions may be provided with an inlet/outlet flow channel allowing the inlet or the outlet to communicate with the recess.

According to the above configuration, it is possible to easily realize a structure for securing the flow rate of the heating medium using the plurality of first flow channels.

The structural member main body may be provided with a rib along a direction in which the hollow portion extends.

According to the above configuration, since the rib is provided, an area where the structural member main body and the heating medium are in contact with each other is increased. Therefore, the heat from the sunlight with which the structural member main body is irradiated and is converted can be efficiently transferred to the heating medium and stored.

The light-receiving surface may be coated with a black film.

According to the above configuration, since the emissivity on the light-receiving surface can be improved, the heating efficiency of the heating medium by sunlight can be improved.

A heat insulating material may be disposed on an outer surface of the structural member except the light-receiving surface.

According to the above configuration, it is possible to suppress or prevent the heat of the heated heating medium or structural member from being released to the atmosphere. The heating efficiency of the heating medium can thus be improved.

The structural member may be a pillar member fixed to the ground and extending in the vertical direction.

According to the above configuration, the heating efficiency of the heating medium can be improved in a time period in which the sun altitude is low, for example at sunrise or sunset. In a time period in which the sun altitude is low, since sunlight is incident on the pillar member at a small incident angle, the solar radiation amount may increase. Therefore, the amount of heat that the pillar member receives from sunlight also increases, and the heating efficiency of the heating medium can be improved.

The structural member may include a buried portion extended beyond the ground and buried in the ground.

According to the above configuration, in addition to heat from sunlight, ground heat can be used for heating the heating medium.

The structural member may be a beam member extending in the lateral direction.

According to the above configuration, the heating efficiency of the heating medium can be improved in a time period in which the sun is located in the south during daytime and the sun altitude is high. In a time period in which the sun altitude is high, since sunlight is incident on the beam member at a small incident angle, the solar radiation amount may increase. Therefore, the amount of heat that the beam member receives from sunlight also increases, and the heating efficiency of the heating medium can be improved.

The structural member may be a pair of rafter members extending in oblique directions and connected to each other.

According to the above configuration, the heating efficiency of the heating medium can be improved in a time period in which the sun is located in the south during daytime and the sun altitude is high. In a time period in which the sun altitude is high, since sunlight is incident on the rafter member at a small incident angle, the solar radiation amount may increase. Therefore, the amount of heat that the rafter member receives from sunlight also increases, and the heating efficiency of the heating medium can be improved.

Effects of the Invention

The building according to the present invention can collect heat from sunlight while suppressing an increase in a shadow generation range which is also a cause of a decrease and unevenness in the solar radiation amount in an agricultural greenhouse.

BRIEF DESCRIPTION OF THE DRAWINGS

FIG. 18 is a perspective view of the lid portion similar to FIG. 6 of the agricultural greenhouse according to the sixth embodiment of the present invention.

FIG. 19 is a perspective view of the lid portion similar to FIG. 7 of the agricultural greenhouse according to the sixth embodiment of the present invention.

DETAILED DESCRIPTION

First Embodiment

Figure 1:
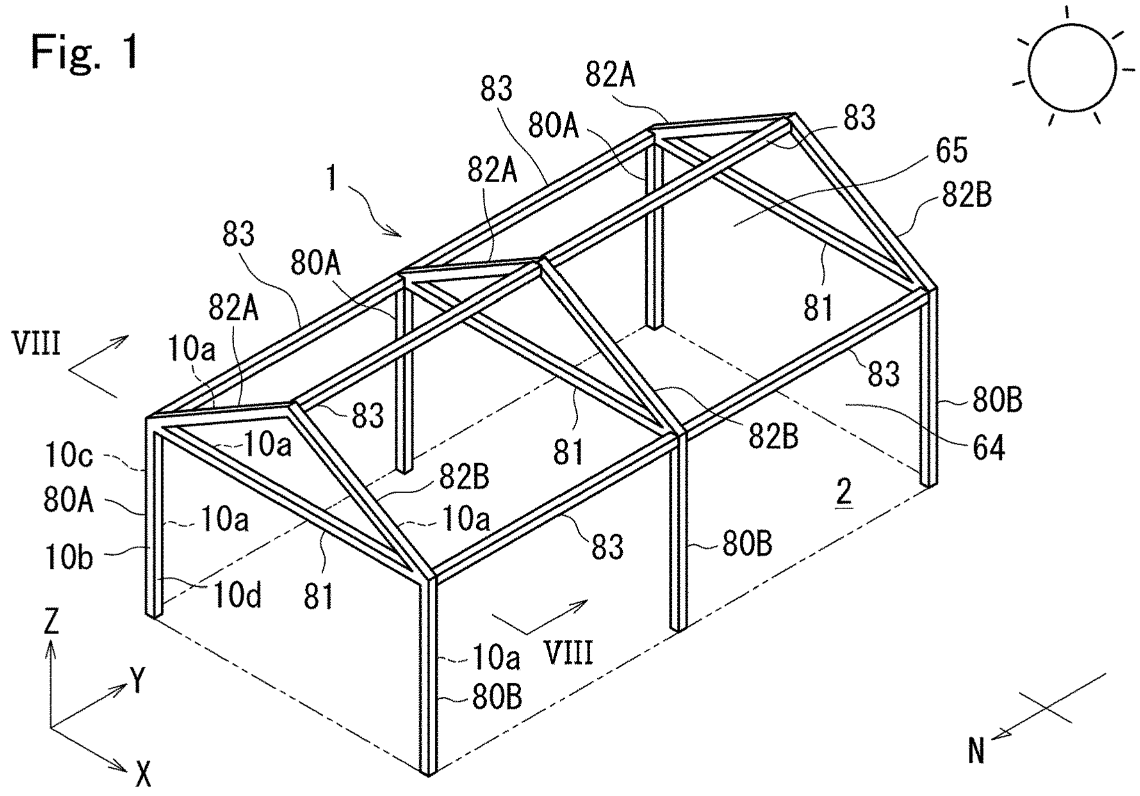
FIG. 1 is a schematic view of an agricultural greenhouse according to a first embodiment of the present invention.

Referring to FIG. 1, an agricultural greenhouse (building) 1 according to the present embodiment is a building installed with respect to the ground 2 so that an installation region is rectangular, and includes pillar members (structural members) 80A and 80B, a beam member (structural member) 81, a pair of rafter members (structural members) 82A and 82B, and a translucent vinyl sheet or a glass plate (not shown) covering them.

In the present embodiment, each of the pillar members 80A and 80B, the beam member 81, and the rafter members 82A and 82B is an essential member for maintaining the structure of the agricultural greenhouse 1, and has rigidity capable of withstanding the weight of the agricultural greenhouse 1, a load applied to the agricultural greenhouse 1 from the outside such as wind, and the like.

In addition, in the present embodiment, the pillar members 80A and 80B, the beam member 81, and the rafter members 82A and 82B are arranged such that a surface (light-receiving surface) 10*a* to be described later faces the sun. Specifically, the pillar members 80A and 80B, the beam member 81, and the rafter members 82A and 82B are arranged such that the surface 10*a* faces the south. As will be described in detail later, by collecting heat of sunlight on the surface 10*a*, the heating medium flowing inside each of the pillar members 80A and 80B, the beam member 81, and the rafter members 82A and 82B is warmed.

In the following description, a shorter direction of the agricultural greenhouse 1 parallel to the ground 2 is defined as an X direction, a longitudinal direction of the agricultural greenhouse 1 parallel to the ground 2 is defined as a Y direction, and a height direction of the agricultural greenhouse 1 perpendicular to the ground 2 is defined as a Z direction.

The agricultural greenhouse 1 is a building elongated in the Y direction in plan view. The pillar members 80A and 80B, the beam member 81, and the rafter members 82A and 82B are provided at a constant pitch in the Y direction, and are connected by a connecting member 83 extending in the Y direction.

The agricultural greenhouse 1 includes a cultivation space 64 and an upper space 65. The cultivation space 64 is a space below the beam member 81, and the upper space 65 is a space above the beam member 81.

Figure 2:
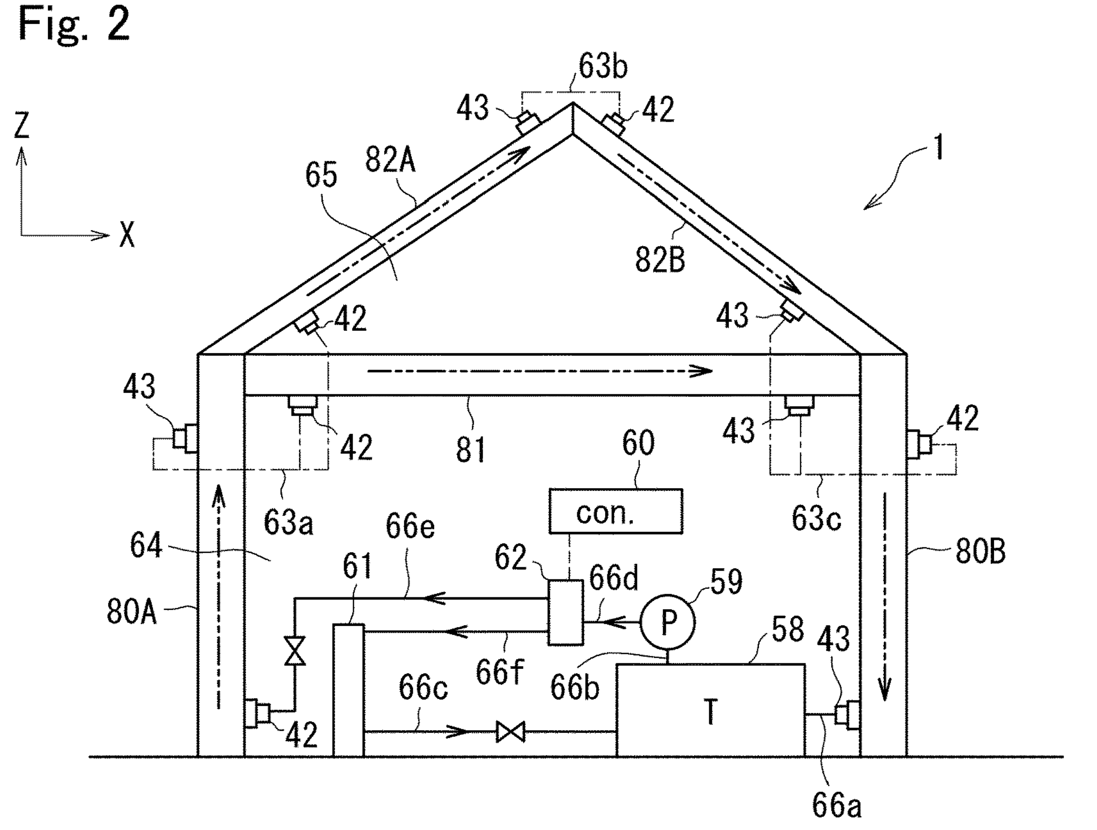
FIG. 2 is a schematic configuration diagram of the agricultural greenhouse according to the first embodiment of the present invention.

Referring to FIG. 2, the agricultural greenhouse 1 includes a tank 58, a pump 59, a control unit 60, a three-way valve 62, and a radiator 61. In the present embodiment, one set of the pillar members 80A and 80B, the beam member 81, and the rafter members 82A and 82B is provided with one set of the tank 58, the pump 59, the control unit 60, the three-way valve 62, and the radiator 61. A set of the tank 58, the pump 59, the control unit 60, the three-way valve 62, and the radiator 61 may be provided in the entire agricultural greenhouse 1.

The tank 58 is connected to the pillar member 80B via a pipe 66*a*, connected to the pump 59 via a pipe 66*b*, and connected to the radiator 61 via a pipe 66*c*. The pump 59 is connected to the three-way valve 62 via a pipe 66*d*. The three-way valve 62 is connected to the pillar member 80A via the pipe 66*e*, and is connected to the radiator 61 via a pipe 66*f*.

The three-way valve 62 is controlled by the control unit 60 to switch the flow of the heating medium flowing from the pipe 66*d* to the pipe 66*e* or the pipe 66*f*.

The heating medium is stored in the tank 58. The heating medium is pumped by the pump 59 and sent to the pillar member 80A or the radiator 61 via the three-way valve 62. Specifically, the heating medium is sent to the pillar member 80A as the heat collecting portion during the day, and is sent to the radiator 61 at night.

As will be described in detail later, the heating medium sent to the pillar member 80A returns to the tank 58 via the beam member 81, the rafter members 82A and 82B, and the pillar member 80B. Meanwhile, the heating medium is warmed by sunlight. The heating medium sent to the radiator 61 returns to the tank 58 via the pipe 66*c*.

In the radiator 61, the heated heating medium flows and exchanges heat with the air in the agricultural greenhouse 1. Therefore, the air in the agricultural greenhouse 1 is warmed, and the heating medium is cooled. As the radiator 61, a known radiator that exchanges heat with a heating medium flowing inside can be used, and for example, a tube crawling on the ground in the agricultural greenhouse 1 can be used.

In the present embodiment, the radiator 61 is disposed in the cultivation space 64. The cultivation space 64 and the upper space 65 may be partitioned by a curtain (not illustrated). The curtain prevents heat transfer between the cultivation space 64 and the upper space 65, thereby improving heat retaining property of the cultivation space 64.

The configuration of the pillar member 80A will be described with reference to FIG. 3. In the present embodiment, since the pillar members 80A and 80B, the beam member 81, and the rafter members 82A and 82B respectively have the same configurations, the description of the configuration of each of the pillar member 80B, the beam member 81, and the rafter members 82A and 82B is omitted.

The pillar member 80A includes a pillar member main body (structural member main body) 10 and a pair of lid portions 40A and 40B.

The pillar member main body 10 is an elongated member formed by extrusion or casting of a metal and extending from the first end portion 15 toward the second end portion 16 at an arbitrary length. In the present embodiment, the pillar member main body 10 is formed of an aluminum alloy. The pillar member main body 10 may be another metal material, for example, steel, aluminum, copper, a copper alloy, silver, or the like. The thermal conductivity of the pillar member main body 10 is more preferably 200 w/m·K or more.

Figure 4:
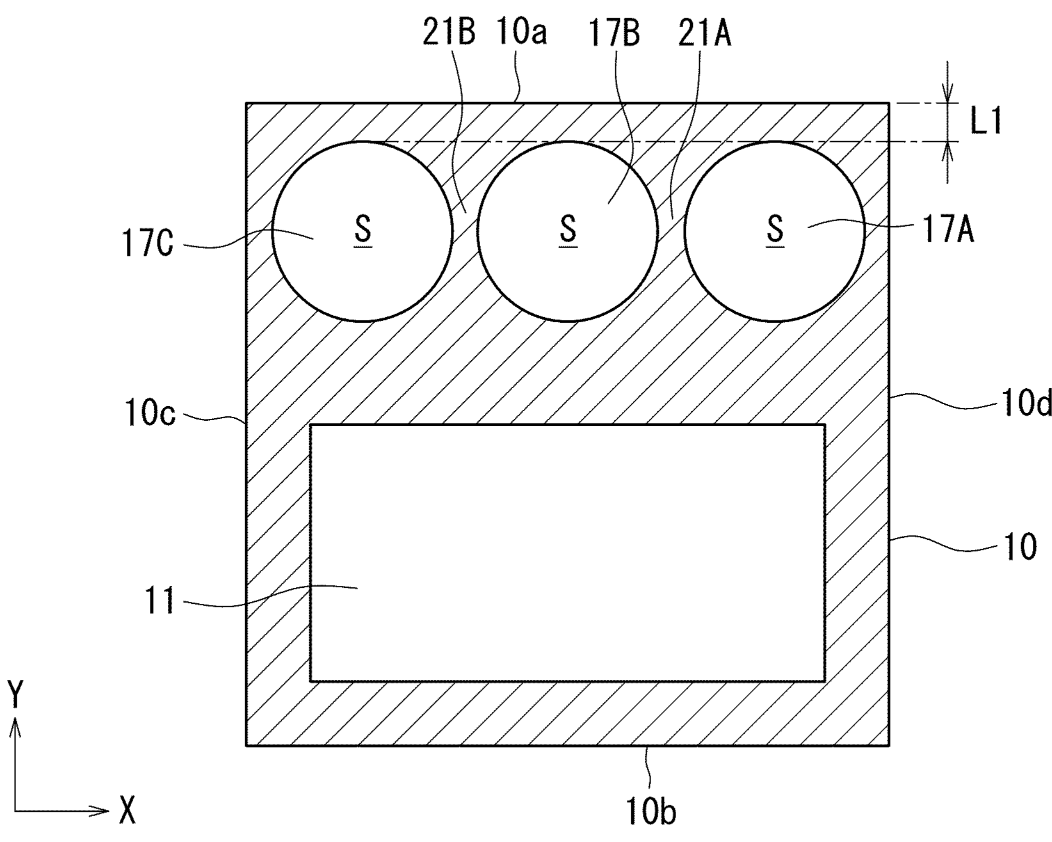
FIG. 4 is a cross-sectional view taken along a line IV-IV in FIG. 3.

Referring to FIG. 4, the pillar member main body 10 has a substantially rectangular shape in a cross section perpendicular to the extending direction, and includes a surface 10*a*, a surface 10*b* facing the surface 10*a*, and surfaces 10*c* and 10*d* connecting the surface 10*a* and the surface 10*b*. As described above, in the present embodiment, the surface 10*a* is irradiated with sunlight.

A hollow portion 20 and a cavity 11 are formed inside the pillar member main body 10. Each of the hollow portion 20 and the cavity 11 extends from the first end portion 15 toward the second end portion 16 and has both ends opened.

Figure 5:
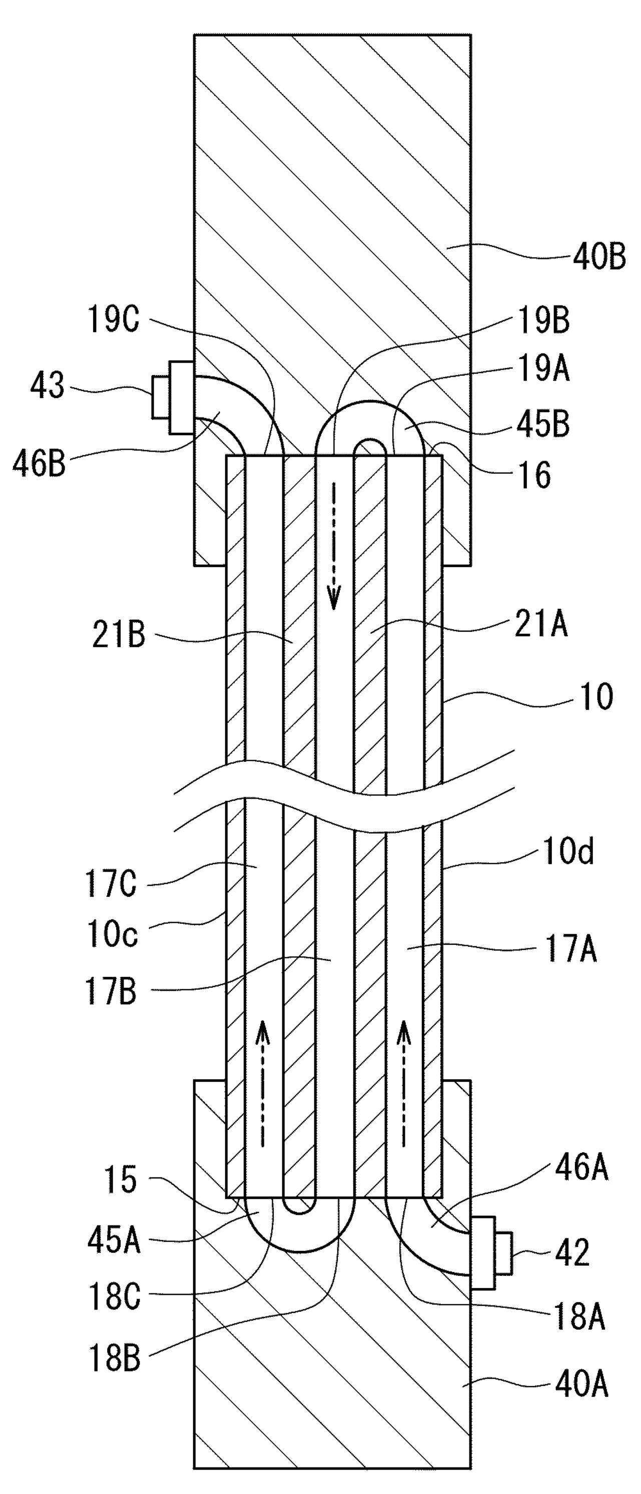
FIG. 5 is a cross-sectional view taken along a line V-V in FIG. 3.
Figure 5:
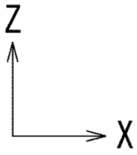

Referring also to FIG. 5, the hollow portion 20 includes two first flow channels 17A and 17C through which the heating medium flows from the first end portion 15 toward the second end portion 16, and one second flow channel 17B through which the heating medium flows from the second end portion 16 toward the first end portion 15. The first flow channel 17A and the second flow channel 17B are arranged so as to be adjacent to each other with the partition wall 21A interposed therebetween, and the first flow channel 17C and the second flow channel 17B are arranged so as to be adjacent to each other with the partition wall 21B interposed therebetween. Each of the first flow channels 17A and 17C and the second flow channel 17B extends parallel to the extending direction of the pillar member main body 10.

The first flow channel 17A is disposed on the surface 10*d* side with respect to the second flow channel 17B. The first flow channel 17A has a first opening 18A at the first end portion 15, and also has a second opening 19A at the second end portion 16.

The second flow channel 17B has a first opening 18B at the first end portion 15, and also has a second opening 19B at the second end portion 16.

The first flow channel 17C is disposed on the surface 10*c* side with respect to the second flow channel 17B. The first flow channel 17C has a first opening 18C at the first end portion 15, and also has a second opening 19C at the second end portion 16.

Referring to FIG. 4, in the present embodiment, the first flow channels 17A and 17C and the second flow channel 17B are arranged on the surface 10*a* side with respect to the cavity 11, and are separated from the surface 10*a* by a distance L1. Each of the first flow channels 17A and 17C and the second flow channel 17B has a round shape in a cross section perpendicular to the extending direction of the pillar member main body 10 and has a constant cross-sectional area S.

The cavity 11 is disposed on the surface 10*b* side with respect to the first flow channels 17A and 17C and the second flow channel 17B. In the present embodiment, the heating medium does not flow in the cavity 11, and is provided to reduce the weight of the pillar member main body 10. Therefore, the shape, position, and size of the cavity 11 are set so as to reduce the weight of the pillar member main body 10 while securing the cross-sectional performance of the pillar member main body 10 in the cross section perpendicular to the extending direction of the pillar member main body 10. The cavity 11 may not be provided.

Figure 3:
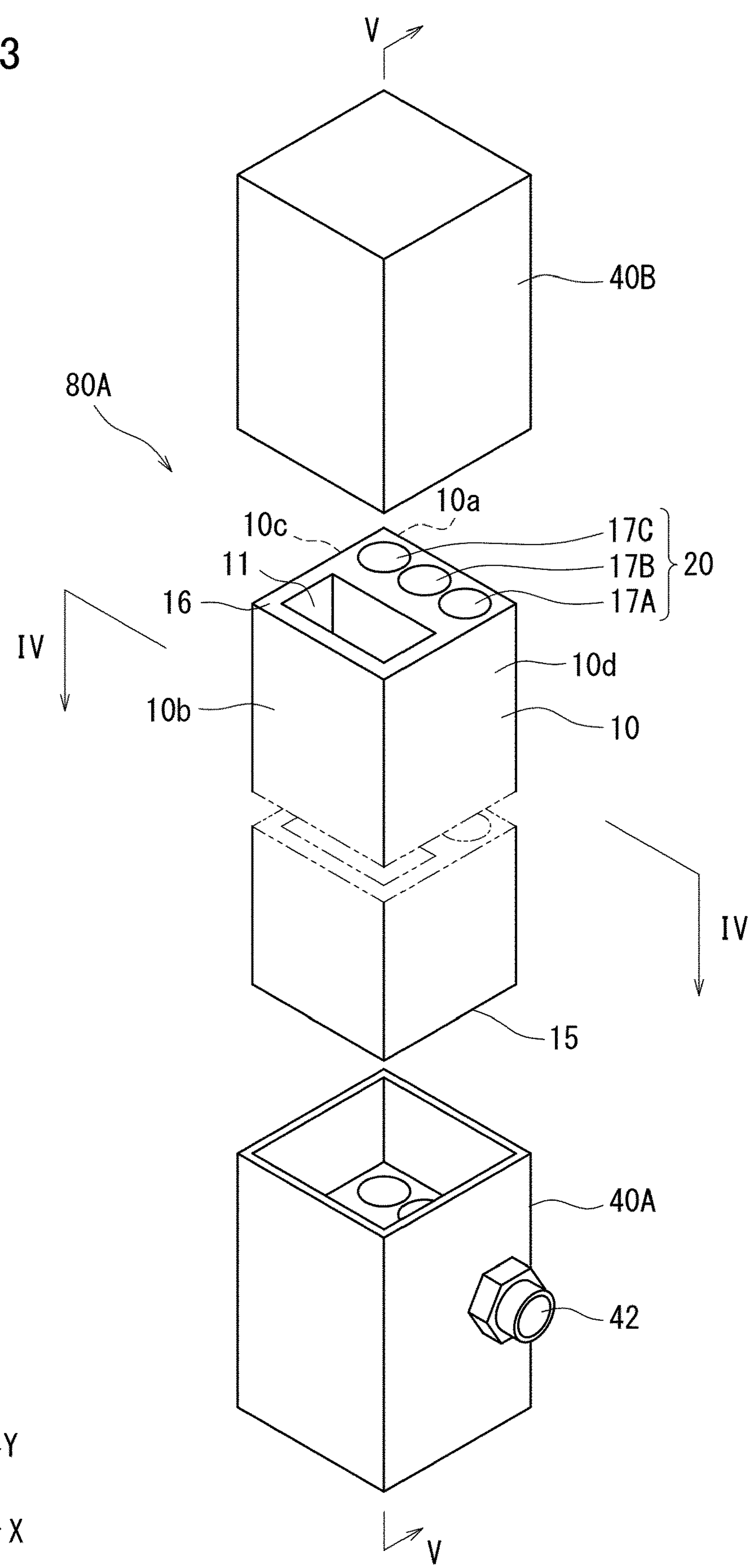
FIG. 3 is an exploded perspective view of a structural member according to the first embodiment of the present invention.

Referring to FIGS. 3 and 5, a lid portion 40A is fixed to the first end portion 15 of the pillar member main body 10 so as to close the hollow portion 20. A lid portion 40B is fixed to the second end portion 16 of the pillar member main body 10 so as to close the hollow portion 20.

In the present embodiment, the lid portions 40A and 40B are formed by cutting an aluminum alloy. The lid portions 40A and 40B may be made of another metal material such as steel, aluminum, copper, a copper alloy, or silver. The thermal conductivity of the lid portions 40A and 40B is more preferably 200 w/m·K or more.

Figure 6:
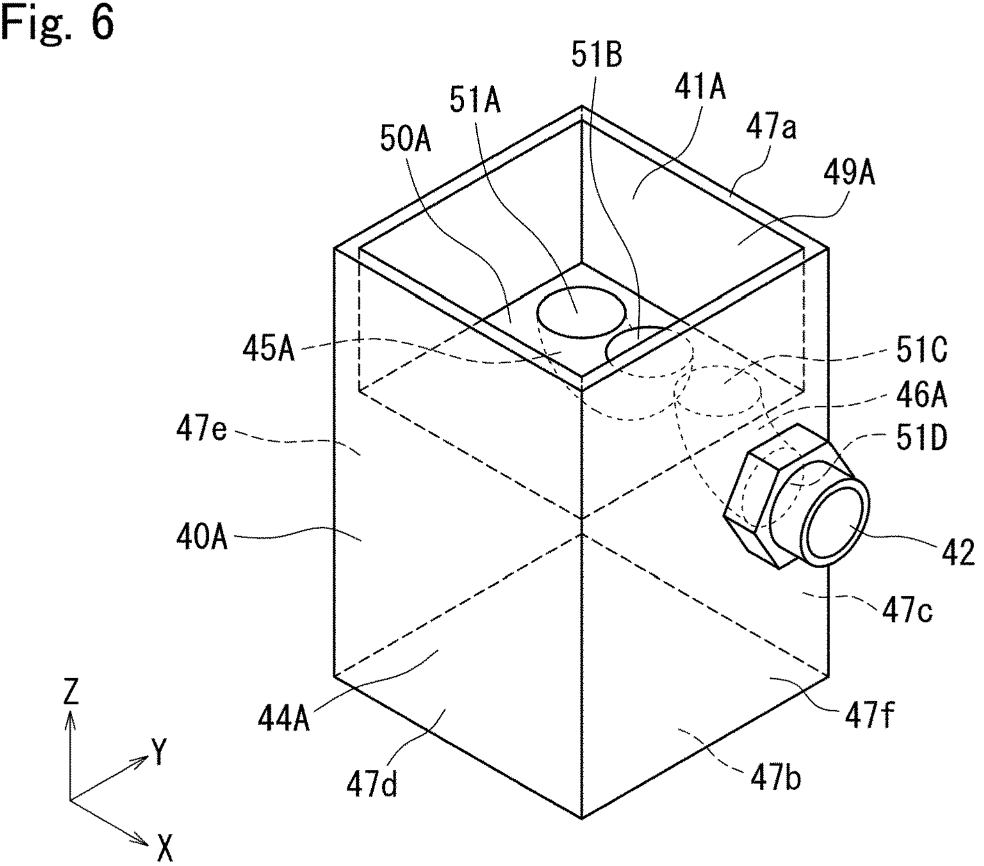
FIG. 6 is a perspective view of a lid portion according to the first embodiment of the present invention.

Referring also to FIG. 6, the lid portion 40A is a rectangular prism member, and has a top surface 47*a*, a bottom surface 47*b* facing the top surface 47*a*, and side surfaces 47*c*, 47*d*, 47*e*, and 47*f* connecting the top surface 47*a* and the bottom surface 47*b*. The top surface 47*a* faces the pillar member main body 10. The side surfaces 47*c*, 47*d*, 47*e*, and 47*f* extend flush with the surfaces 10*a*, 10*b*, 10*c*, and 10*d* of the pillar member main body 10, respectively.

The lid portion 40A has a recess 41A having a hollow structure and a base portion 44A having a solid structure. The recess 41A is provided so as to form an opening 49A on the top surface 47*a*. The base portion 44A is disposed on the bottom surface 47*b* side.

The side surface 47*f* is provided with an inlet 42 through which the heating medium flows into the first flow channel 17A.

The shape of the opening 49A of the recess 41A is the same as the outer shape of the cross-sectional shape perpendicular to the extending direction of the pillar member main body 10, that is, a substantially rectangular shape. The first end portion 15 side of the pillar member main body 10 is fitted to the recess 41A, and the first end portion 15 is in close contact with the contact surface 50A of the recess 41A. The lid portion 40A is fixed to the pillar member main body 10 by an arbitrary fixing method such as welding.

The base portion 44A is provided with a connection flow channel 45A. The connection flow channel 45A is a U-shaped flow channel having openings 51A and 51B at both ends. The opening 51A is aligned with the first opening 18C, and the opening 51B is aligned with the first opening 18B. Therefore, the connection flow channel 45A allows the second flow channel 17B and the first flow channel 17C to communicate with each other, and bends the flow direction of the heating medium by 180 degrees.

The base portion 44A is provided with an inlet/outlet flow channel 46A. The inlet/outlet flow channel 46A is a flow channel having openings 51C and 51D at both ends. The opening 51C is aligned with the first opening 18A, and the opening 51D is aligned with the inlet 42. Therefore, the inlet/outlet flow channel 46A allows the first flow channel 17A and the inlet 42 to communicate with each other.

Figure 7:
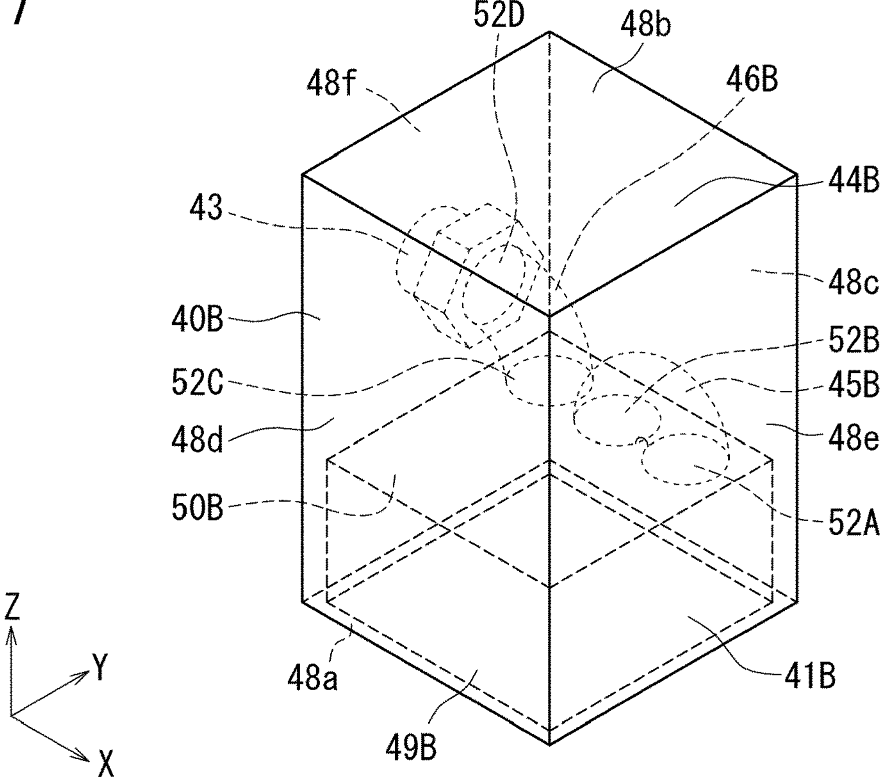
FIG. 7 is a perspective view of the lid portion according to the first embodiment of the present invention.

Referring to FIGS. 3, 5, and 7, the lid portion 40B is a rectangular parallelepiped member, and has a top surface 48*a*, a bottom surface 48*b* facing the top surface 48*a*, and side surfaces 48*c*, 48*d*, 48*e*, and 48*f* connecting the top surface 48*a* and the bottom surface 48*b*. The top surface 48*a* faces the pillar member main body 10. The side surfaces 48*c*, 48*d*, 48*e*, and 48*f* extend so as to be coplanar with the surfaces 10*a*, 10*b*, 10*d*, and 10*c* of the pillar member main body 10, respectively.

The lid portion 40B has a recess 41B having a hollow structure and a base portion 44B having a solid structure. The recess 41B is provided so as to form an opening 49B on the top surface 48*a*. The base portion 44B is disposed on the bottom surface 48*b* side.

The side surface 48*f* is provided with an outlet 43 through which the heating medium flows out from the first flow channel 17C.

The shape of the opening 49B of the recess 41B is the same as the outer shape of the cross-sectional shape perpendicular to the extending direction of the pillar member main body 10, that is, a substantially rectangular shape. The second end portion 16 side of the pillar member main body 10 is fitted into the recess 41B, and the second end portion 16 is in close contact with the contact surface 50B of the recess 41B. The lid portion 40B is fixed to the pillar member main body 10 by an arbitrary fixing method such as welding.

The base portion 44B is provided with a connection flow channel 45B. The connection flow channel 45B is a U-shaped flow channel having openings 52A and 52B at both ends. The opening 52A is aligned with the second opening 19A, and the opening 52B is aligned with the second opening 19B. Therefore, the connection flow channel 45B allows the first flow channel 17A and the second flow channel 17B to communicate with each other, and bends the flow direction of the heating medium by 180 degrees.

The base portion 44B is provided with an inlet/outlet flow channel 46B. The inlet/outlet flow channel 46B is a flow channel having openings 52C and 52D at both ends. The opening 52C is aligned with the second opening 19C, and the opening 52D is aligned with the outlet 43. Therefore, the inlet/outlet flow channel 46B allows the first flow channel 17C and outlet 43 to communicate with each other.

Referring to FIG. 5, the heating medium flowing in from the inlet 42 flows into the first flow channel 17A via the inlet/outlet flow channel 46A of the lid portion 40A, flows through the first flow channel 17A from the first end portion 15 toward the second end portion 16, and flows into the second flow channel 17B via the connection flow channel 45B of the lid portion 40B. The heating medium flowing into the second flow channel 17B flows from the second end portion 16 toward the first end portion 15, and flows into the first flow channel 17C via the connection flow channel 45A of the lid portion 40A. The heating medium flowing into the first flow channel 17C flows from the first end portion 15 toward the second end portion 16, and flows out to the outside of the pillar member 80A via the inlet/outlet flow channel 46B of the lid portion 40B and the outlet 53. That is, the heating medium flows in a meandering manner from the inlet 42 toward the outlet 43 via the first flow channels 17A and 17C, the second flow channel 17B, the connection flow channels 45A and 45B, and the inlet/outlet flow channels 46A and 46B.

As described above, each of the pillar member 80B, the beam member 81, and the rafter members 82A and 82B has the same configuration as that of the pillar member 80A. That is, in each of the pillar member 80B, the beam member 81, and the rafter members 82A and 82B, the heating medium flowing in from the inlet 42 flows in a meandering manner toward the outlet 43.

Figure 8:
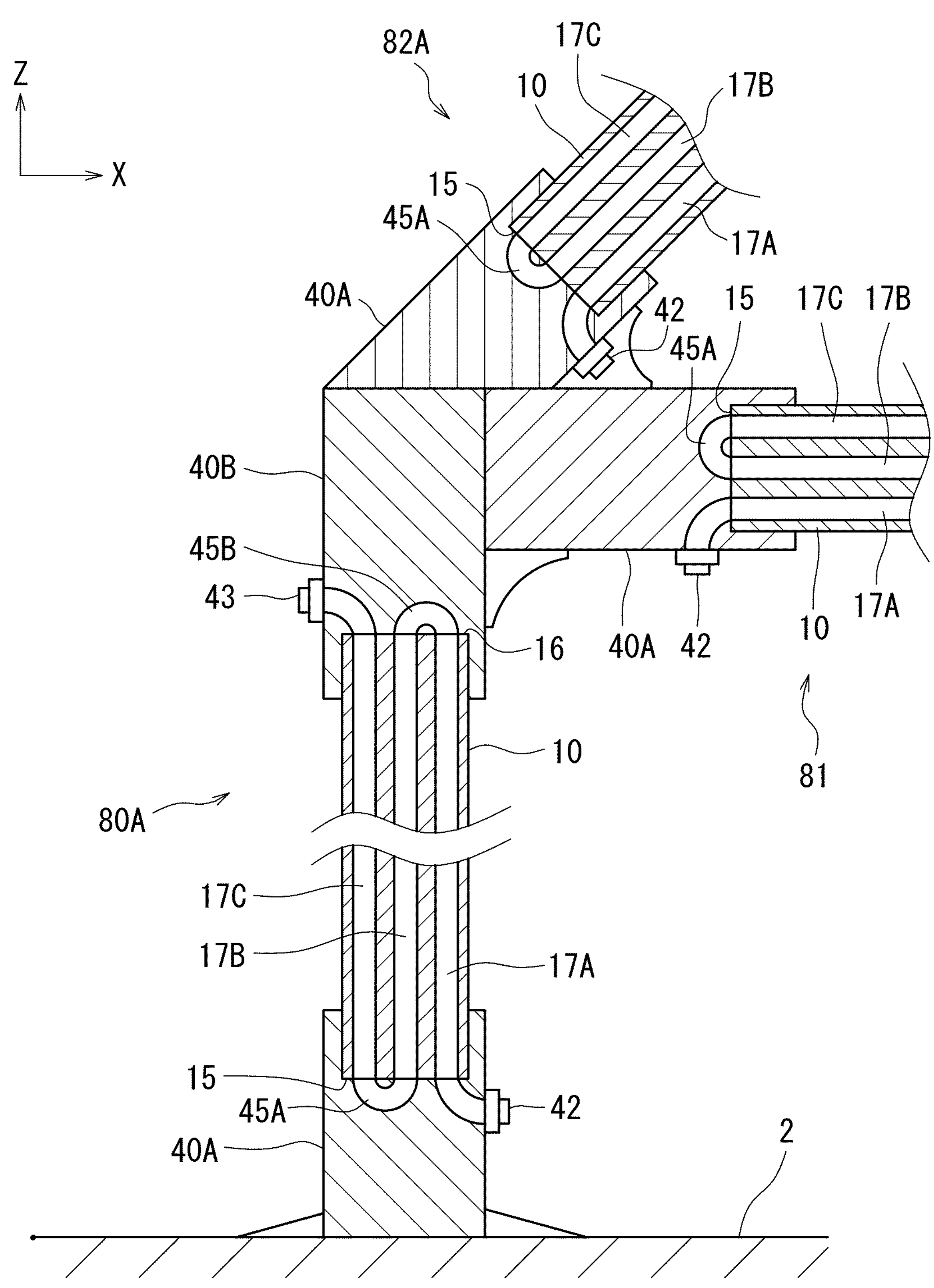
FIG. 8 is a partial cross-sectional view taken along a line VIII-VIII in FIG. 1.
Figure 9:
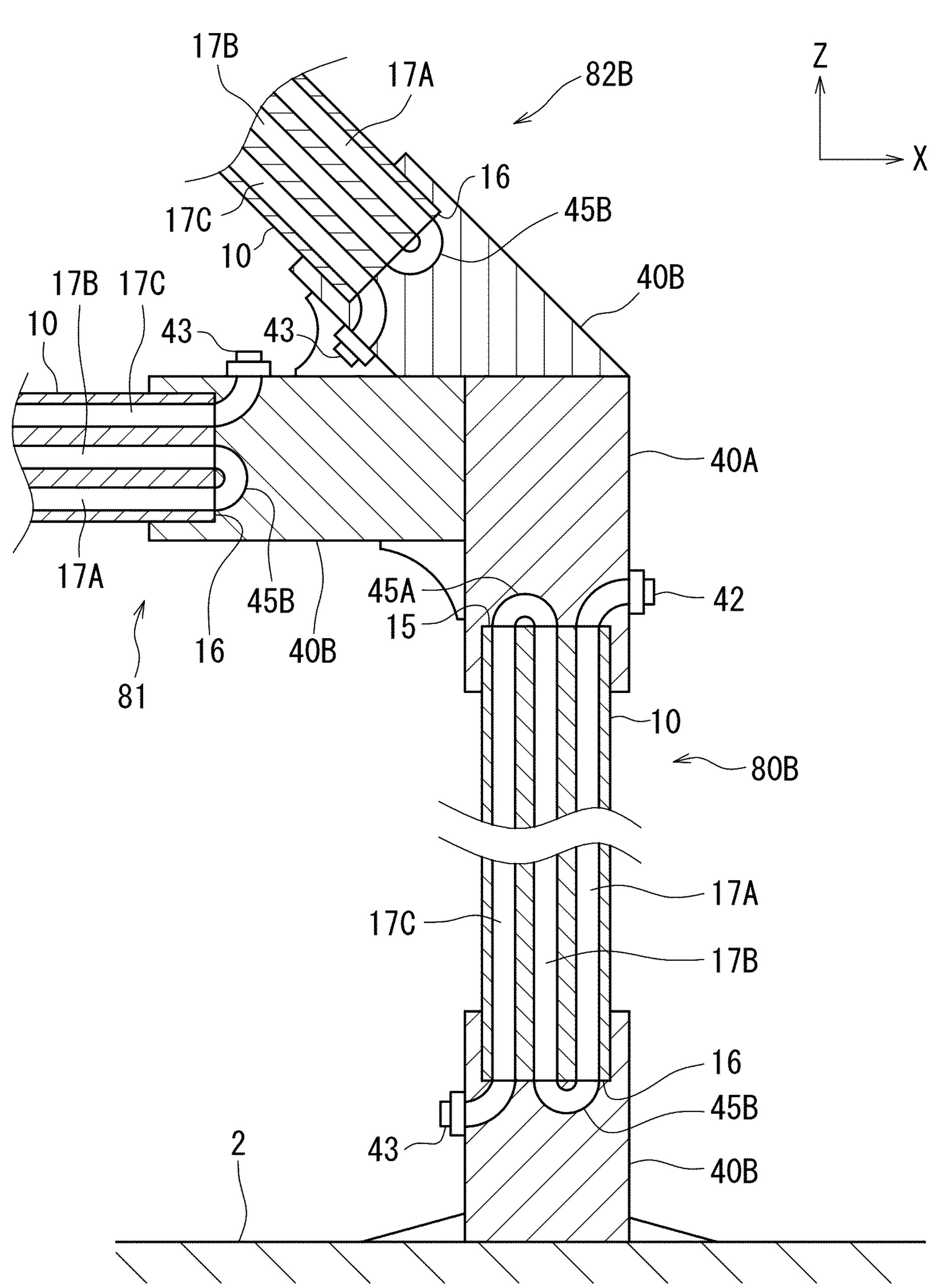
FIG. 9 is a partial cross-sectional view similar to FIG. 8.

Referring to FIGS. 8 and 9, in the pillar member 80A, the lid portion 40A is fixed to the ground 2 and extends in the Z direction (vertical direction). In the pillar member 80B, the lid portion 40B is fixed to the ground 2 and extends in the Z direction (vertical direction).

The beam member 81 extends in the X direction (lateral direction) so as to connect the lid portion 40B of the pillar member 80A and the lid portion 40A of the pillar member 80B. The lid portion 40A of the beam member 81 is fixed to the lid portion 40B of the pillar member 80A, and the lid portion 40B of the beam member 81 is fixed to the lid portion 40A of the pillar member 80B by welding or the like.

The rafter member 82A extends obliquely upward from the lid portion 40B of the pillar member 80A toward the center of the agricultural greenhouse 1. The rafter member 82B extends obliquely upward from the lid portion 40A of the pillar member 80B toward the center of the agricultural greenhouse 1. The lid portion 40A of the rafter member 82A is fixed to the lid portion 40B of the pillar member 80A and the lid portion 40A of the beam member 81 by welding or the like. The lid portion 40B of the rafter member 82B is fixed to the lid portion 40A of the pillar member 80B and the lid portion 40B of the beam member 81 by welding or the like.

Figure 10:
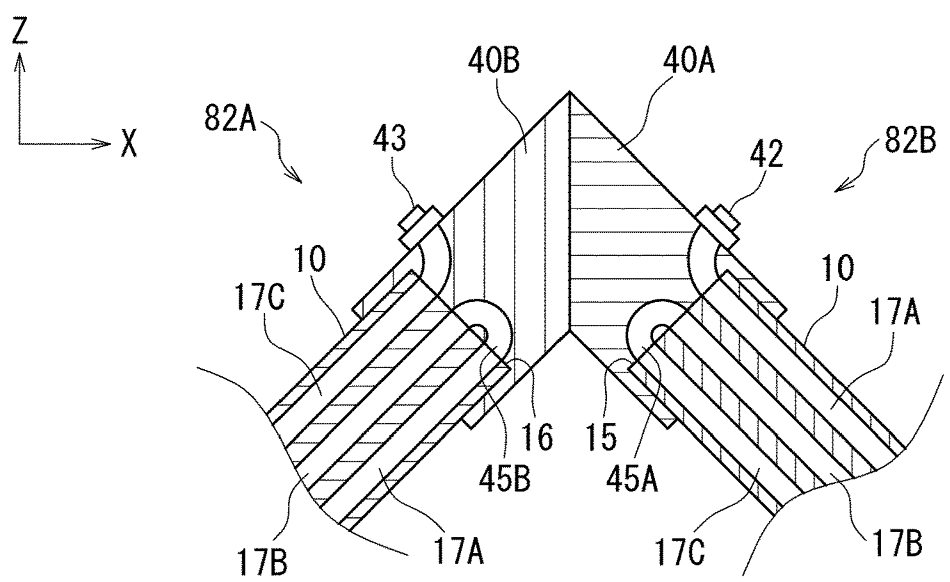
FIG. 10 is a partial cross-sectional view similar to FIG. 8.

Referring also to FIG. 10, the lid portion 40B of the rafter member 82A is connected to the lid portion 40A of the rafter member 82B. The lid portion 40B of the rafter member 82A is fixed to the lid portion 40A of the rafter member 82B by welding or the like.

In the present embodiment, the tips of the respective lid portions 40A and 40B of the rafter members 82A and 82B each form an inclination angle, whereby the rafter members 82A and 82B each extend obliquely.

Referring to FIG. 2, the inlet 42 of the pillar member 80A is connected to the three-way valve 62 through the pipe 66*e*.

The outlet 43 of the pillar member 80A is connected to the inlet 42 of the beam member 81 and the inlet 42 of the rafter member 82A via the external pipe 63*a*.

The outlet 43 of the rafter member 82A is connected to the inlet 42 of the rafter member 82B via the external pipe 63*b*.

The outlet 43 of the beam member 81 and the outlet 43 of the rafter member 82B are connected to the inlet 42 of the pillar member 80B via an external pipe 63*c*.

The outlet 43 of the pillar member 80B is connected to the tank 58 via the pipe 66*a*.

A flow of the heating medium in the agricultural greenhouse 1 will be described with reference to FIG. 2.

In the agricultural greenhouse 1 according to the present embodiment, a neutral to weakly alkaline heating medium is used so that the aluminum alloy does not rust. Specifically, a heating medium having a pH of 6 to 11 is used.

While the agricultural greenhouse 1 is irradiated with sunlight during the day, the three-way valve 62 is controlled by the control unit 60, and the heating medium flows so as to circulate through the tank 58, the pillar members 80A and 80B, the beam member 81, and the rafter members 82A and 82B. Specifically, the heating medium is pumped by the pump 59 from the tank 58 toward the inlet 42 of the pillar member 80A via the pipes 66*b*, 66*d*, and 66*e* and the three-way valve 62. The heating medium flowing into the pillar member 80A flows inside the pillar member 80A in a meandering manner and flows out from the outlet 43 of the pillar member 80A. The heating medium flowing out of the pillar member 80A flows into the beam member 81 and the rafter member 82A via the external pipe 63*a*. The heating medium flowing into the beam member 81 flows inside the beam member 81 in a meandering manner and flows out from the outlet 43 of the beam member 81. The heating medium flowing into the rafter member 82A flows in a meandering manner inside the rafter member 82A, flows out from the outlet 43 of the rafter member 82A, and flows into the rafter member 82B via the external pipe 63*b*. The heating medium flowing into the rafter member 82B flows in a meandering manner inside the rafter member 82B and flows out from the outlet 43 of the rafter member 82B. The heating medium flowing out from the rafter member 82B merges with the heating medium flowing out from the beam member 81 through the external pipe 63*c*, and flows into the pillar member 80B. The heating medium flowing into the pillar member 80B flows in a meandering manner inside the pillar member 80B, flows out from the outlet 43 of the pillar member 80B, and returns to the tank 58 via the pipe 66*a*. During this time, the heating medium is heated by each of the pillar members 80A and 80B, the beam member 81, and the rafter members 82A and 82B, and the temperature rises.

While the agricultural greenhouse 1 is not irradiated with sunlight at night, the three-way valve 62 is controlled by the control unit 60, and the heating medium stored in the tank 58 flows so as to circulate through the radiator 61. Specifically, the heating medium is pumped by the pump 59 from the tank 58 toward the radiator 61 via the pipes 66*b*, 66*d*, and 66*f* and the three-way valve 62. In the radiator 61, the heated heating medium exchanges heat with air in the cultivation space 64, and the temperature in the cultivation space 64 rises. The heating medium cooled by heat exchange in the radiator 61 returns to the tank 58 via the pipe 66*c*.

In the agricultural greenhouse 1 according to the present embodiment, sunlight incident on the surface 10*a* of the structural member main body 10 is converted into heat in the structural member main body 10, and the heat can be stored in the heating medium. That is, heat can be collected from sunlight in each of the pillar members 80A and 80B, the beam member 81, and the rafter members 82A and 82B. The agricultural greenhouse 1 is constructed such that the configuration other than the structural member and a transparent sheet is minimized in order to secure the light amount in the agricultural greenhouse 1. In other words, in the agricultural greenhouse 1, it is not desirable to provide a configuration other than the structural member and the transparent sheet because a decrease and unevenness in the solar radiation amount in the agricultural greenhouse occur. In the present embodiment, since heat can be collected from sunlight in each of the pillar members 80A and 80B, the beam member 81, and the rafter members 82A and 82B, it is possible to suppress installation of other heat collecting members, and it is possible to suppress an increase in the range of shadow which is also a cause of a decrease and unevenness in the solar radiation amount in the agricultural greenhouse.

In addition, since the hollow portion 20 includes the first flow channels 17A and 17C and the second flow channel 17B, the flow channel through which the heating medium flows becomes long, and the area where the structural member main body 10 and the heating medium are in contact with each other can be increased. Therefore, the heat of the structural member main body 10 heated by sunlight can be efficiently transferred to the heating medium.

Since the heating medium flows in a meandering manner, it is possible to secure a large area where the structural member main body 10 and the heating medium are in contact with each other. In addition, the time during which the structural member main body 10 and the heating medium are in contact with each other can be long. Therefore, heat from sunlight can be efficiently stored in the heating medium. In addition, by processing the lid portions 40A and 40B and providing the connection flow channels 45A and 45B, a flow channel in which the heating medium flows in a meandering manner can be formed. Therefore, processing for forming the meandering flow channel in the structural member main body 10 is not required, and the structural member main body 10 can be easily manufactured.

Since the pillar members 80A and 80B are provided, the heating efficiency of the heating medium can be improved in a time period in which the sun altitude is low, for example at sunrise or sunset. In a time period in which the sun altitude is low, since sunlight is incident on the pillar members 80A and 80B at a small incident angle, the solar radiation amount may increase. Therefore, the amount of heat that the pillar members 80A and 80B receive from sunlight also increases, and the heating efficiency of the heating medium can be improved. Here, the incident angle is an angle formed by a normal line of a surface irradiated with sunlight and a sunbeam.

Since the beam member 81 is provided, the heating efficiency of the heating medium can be improved in a time period in which the sun is located in the south during daytime and the sun altitude is high. In a time period in which the sun altitude is high, since sunlight is incident on the beam member 81 at a small incident angle, the solar radiation amount may increase. Therefore, the amount of heat that the beam member 81 receives from sunlight also increases, and the heating efficiency of the heating medium can be improved.

Since the rafter members 82A and 82B are provided, the heating efficiency of the heating medium can be improved in a time period in which the sun is located in the south during the day and the sun altitude is high. In a time period in which the sun altitude is high, since sunlight is incident on the rafter members 82A and 82B at a small incident angle, the solar radiation amount may increase. Therefore, the amount of heat that the rafter members 82A and 82B receive from sunlight also increases, and the heating efficiency of the heating medium can be improved.

Since the heating medium heated by sunlight exchanges heat with the radiator 61 to warm the air in the cultivation space 64, growth inhibition of plants due to temperature decrease at night is alleviated, and the growth rate of the plants can be improved.

Figure 11:
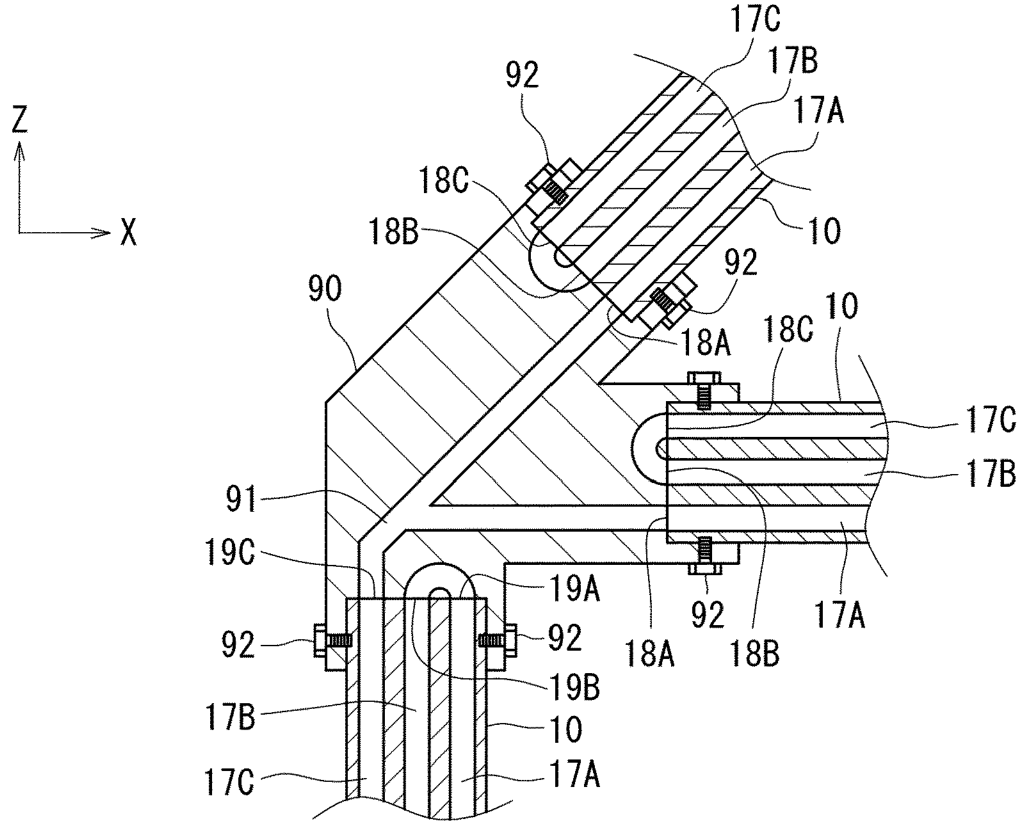
FIG. 11 is a view showing a modification of the first embodiment of the present invention.

Referring to FIG. 11, according to the modification of the present embodiment, the agricultural greenhouse 1 includes a connection lid portion 90. The connection lid portion 90 is formed as one component by integrally forming the lid portion 40B of the pillar member 80A, the lid portion 40A of the beam member 81, and the lid portion 40A of the rafter member 82A. In place of the external pipe 63*a* (shown in FIG. 2), a lid portion flow channel 91 is provided inside the connection lid portion 90. The lid portion flow channel 91 connects the second opening 19C of the pillar member 80A to the first opening 18A of the beam member 81 and the first opening 18A of the rafter member 82A. Since the external pipe 63*a* is not disposed, the agricultural greenhouse 1 can be easily assembled.

Further, according to the modification of the present embodiment, each of the pillar member 80A, the beam member 81, and the rafter member 82A is fixed to the connection lid portion 90 by a screw 92. Therefore, the agricultural greenhouse 1 can be easily assembled.

Second Embodiment

Figure 12:
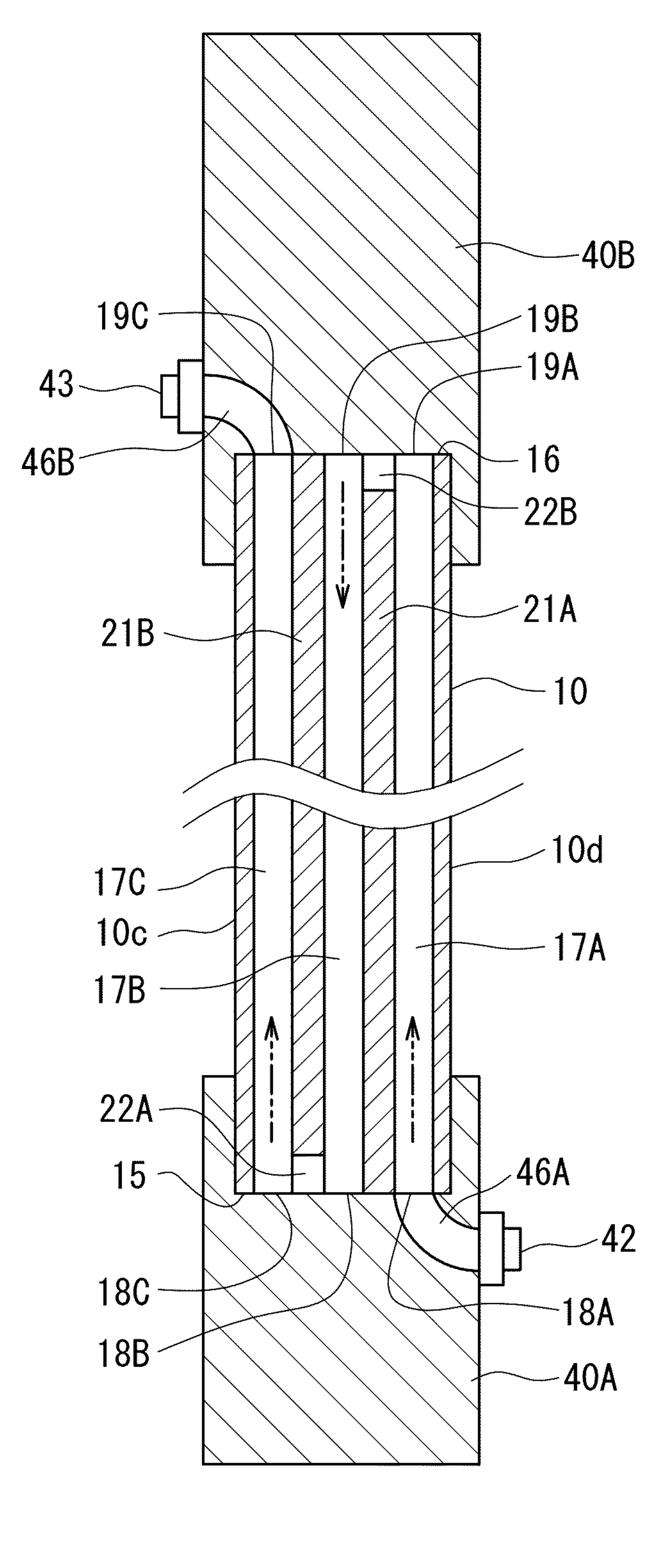
FIG. 12 is a cross-sectional view similar to FIG. 5 of an agricultural greenhouse according to a second embodiment of the present invention.
Figure 12:
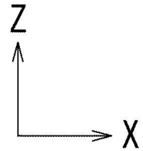

Referring to FIG. 12, a configuration of an agricultural greenhouse 1 according to a second embodiment is different from that of the first embodiment in the following points. Other configurations of the second embodiment are similar to those of the first embodiment, and the same or similar elements as those of the first embodiment are denoted by the same reference numerals.

In the second embodiment, the lid portions 40A and 40B are not provided with the connection flow channels 45A and 45B (shown in FIG. 5), and the liquid passage holes 22A and 22B are provided in the pillar member main body 10.

The liquid passage hole 22A is provided on the first end portion 15 side of the partition wall 21B that separates the second flow channel 17B and the first flow channel 17C, and allows the second flow channel 17B and the first flow channel 17C to communicate with each other. The liquid passage hole 22B is provided on the second end portion 16 side of the partition wall 21A that separates the first flow channel 17A and the second flow channel 17B, and allows the first flow channel 17A and the second flow channel 17B to communicate with each other.

The heating medium flowing into the pillar member main body 10 through the inlet 42 and the inlet/outlet flow channel 46A flows through the first flow channel 17A from the first end portion 15 toward the second end portion 16, and flows into the second flow channel 17B through the liquid passage hole 22B. The heating medium flowing into the second flow channel 17B flows from the second end portion 16 toward the first end portion 15, and flows into the first flow channel 17C via the liquid passage hole 22A. The heating medium flowing into the first flow channel 17C flows from the first end portion 15 toward the second end portion 16, and flows out to the outside of the pillar member main body 10 via the inlet/outlet flow channel 46B and the outlet 43. That is, the heating medium flows in a meandering manner from the inlet 42 toward the outlet 43 via the first flow channels 17A and 17C, the second flow channel 17B, the liquid passage holes 22A and 22B, and the inlet/outlet flow channels 46A and 46B.

In the agricultural greenhouse 1 according to the second embodiment, since the heating medium flows in a meandering manner, it is possible to secure a large area where the structural member main body 10 and the heating medium are in contact with each other. In addition, the time during which the structural member main body 10 and the heating medium are in contact with each other can be long. Therefore, heat from sunlight can be efficiently stored in the heating medium. In addition, by processing the structural member main body 10 and providing the liquid passage hole, a flow channel in which the heating medium flows in a meandering manner can be formed. Therefore, processing for forming the meandering flow channel is not required for the lid portions 40A and 40B, and the lid portions 40A and 40B can be easily manufactured.

Third Embodiment

Figure 13:
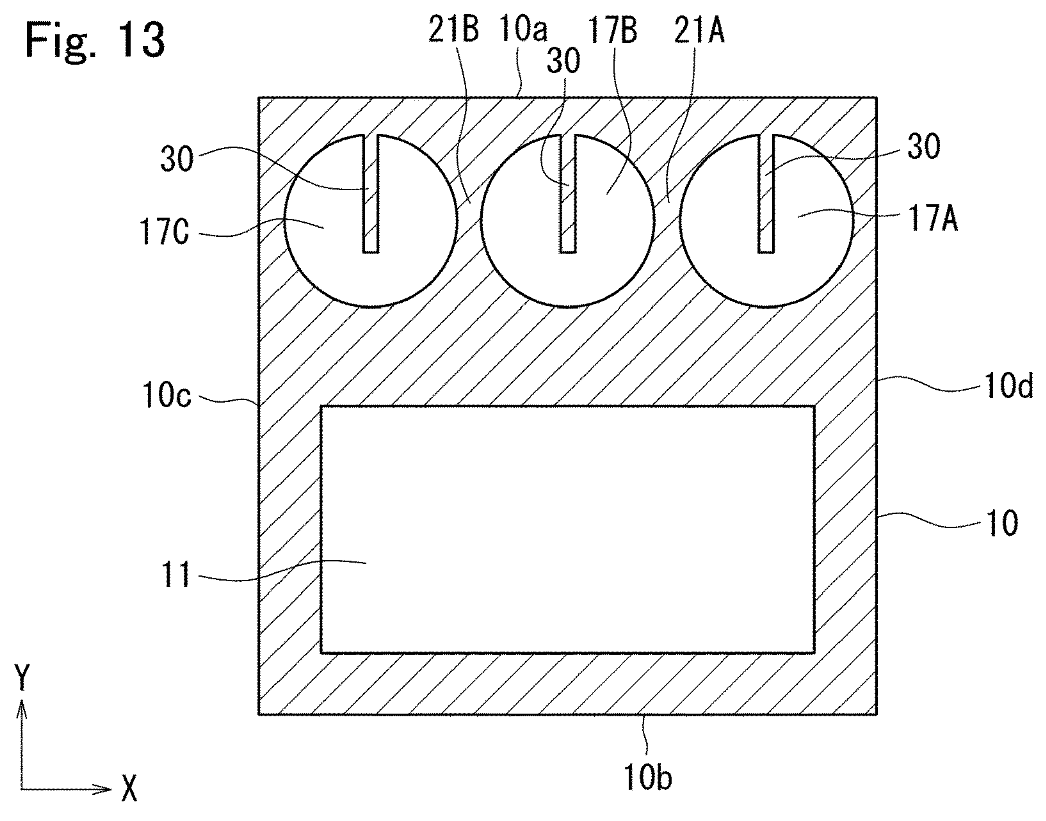
FIG. 13 is a cross-sectional view of an agricultural greenhouse according to a third embodiment of the present invention, similar to FIG. 4.

Referring to FIG. 13, a configuration of an agricultural greenhouse 1 according to a third embodiment is different from that of the first embodiment in the following points. Other configurations of the third embodiment are similar to those of the first embodiment, and the same or similar elements as those of the first embodiment are denoted by the same reference numerals.

The pillar member main body 10 is provided with a rib 30 protruding toward the first flow channel 17A. The rib 30 extends from the first end portion 15 (shown in FIG. 3) to the second end portion 16 (shown in FIG. 3) along the extending direction of the pillar member main body 10. Similarly, ribs 30 are provided in each of the second flow channel 17B and the first flow channel 17C. The rib 30 is formed integrally with the pillar member main body 10 by extrusion or casting.

According to the agricultural greenhouse 1 according to the third embodiment, since the rib 30 is provided, the area where the structural member main body 10 and the heating medium are in contact with each other is increased. Therefore, the heat from the sunlight with which the structural member main body 10 is irradiated and is converted can be efficiently transferred to the heating medium and stored. In addition, since the structural member main body 10 is an extrusion product or a cast product, a structure having such a rib 30 can also be easily formed.

Fourth Embodiment

Figure 14:
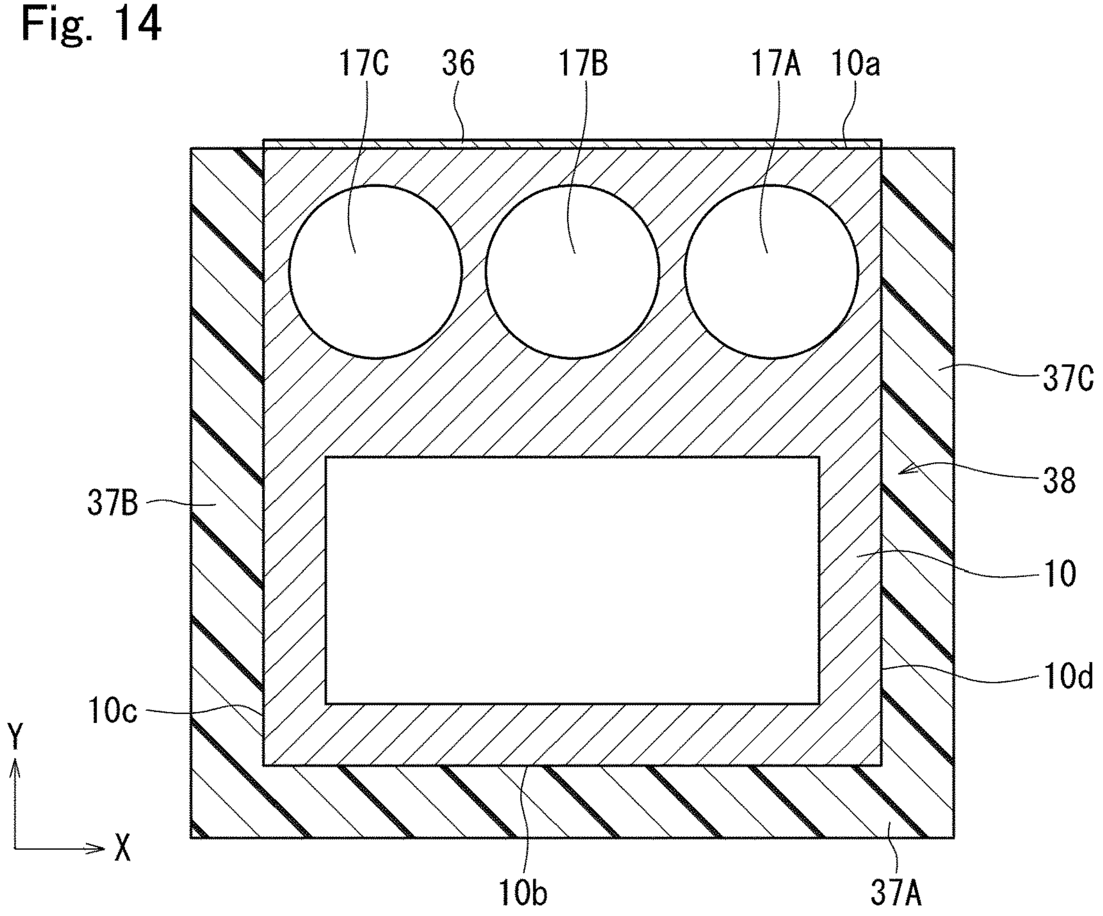
FIG. 14 is a cross-sectional view of an agricultural greenhouse according to a fourth embodiment of the present invention, similar to FIG. 4.

Referring to FIG. 14, a configuration of an agricultural greenhouse 1 according to a fourth embodiment is different from that of the first embodiment in the following points. Other configurations of the fourth embodiment are similar to those of the first embodiment, and the same or similar elements as those of the first embodiment are denoted by the same reference numerals.

The surface 10*a* of the pillar member main body 10 is coated with a black film 36. The black film 36 is, for example, a high emissivity film obtained by electrolytically treating an aluminum alloy, and absorbs light of almost all wavelengths of sunlight.

In the outer surface 38 of the pillar member main body 10, the heat insulating materials 37A, 37B, and 37C are disposed on the outer surface 38 excluding the surface 10*a*. The heat insulating material 37A is disposed so as to be in contact with the surface 10*b*, and the heat insulating material 37B is disposed so as to be in contact with the surface 10*c*. The heat insulating material 37C is disposed so as to be in contact with the surface 10*d*.

According to the heat collecting member in the fourth embodiment, since the emissivity on the surface 10*a* can be improved, the heating efficiency of the heating medium by sunlight can be improved.

In addition, since the heat insulating materials 37A to 37C are provided, it is possible to suppress or prevent heat of the heated heating medium or the structural member main body 10 from being radiated to the atmosphere. The heating efficiency of the heating medium can thus be improved.

Fifth Embodiment

Figure 15:
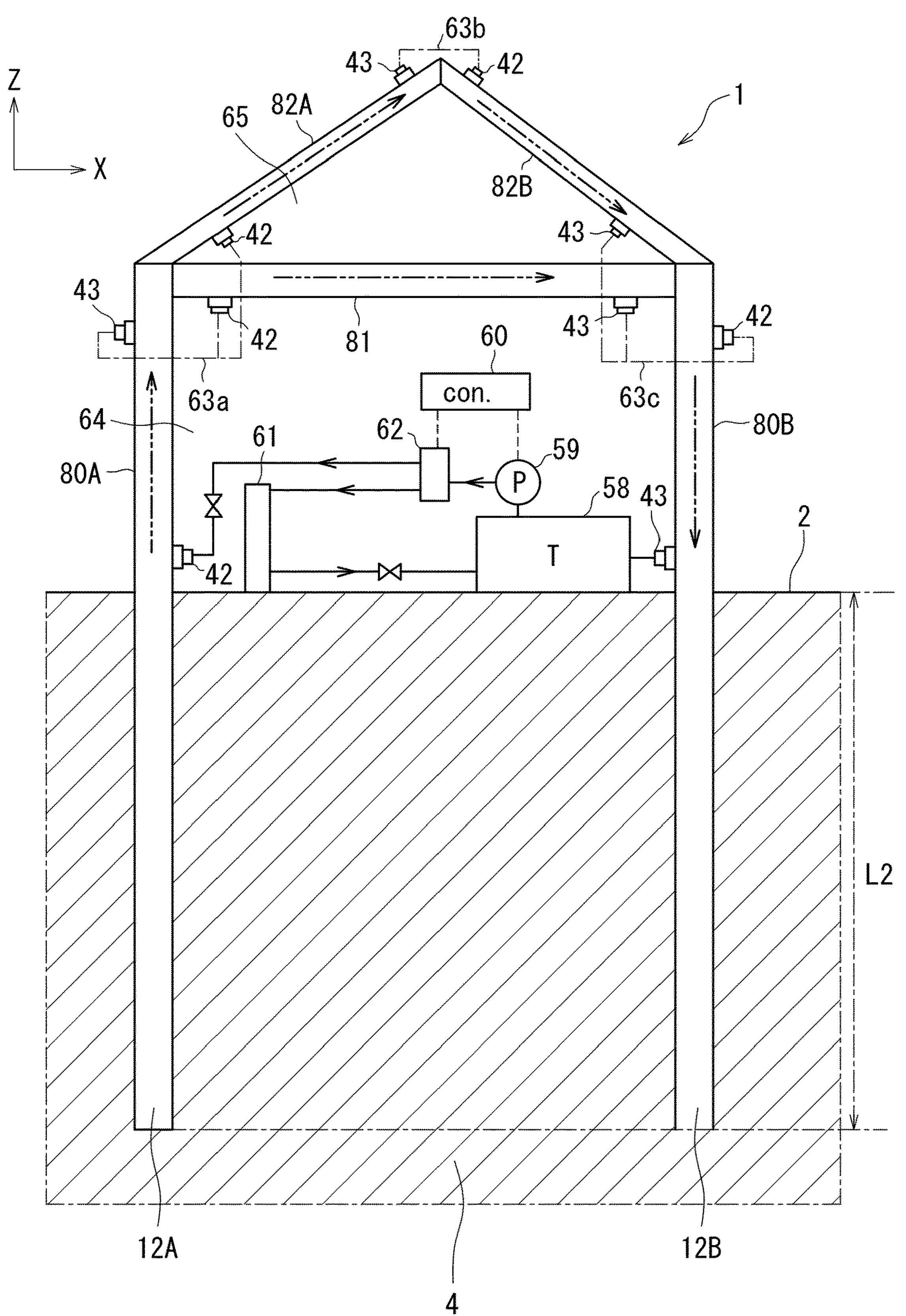
FIG. 15 is a schematic configuration diagram of an agricultural greenhouse according to a fifth embodiment of the present invention.
Figure 16:
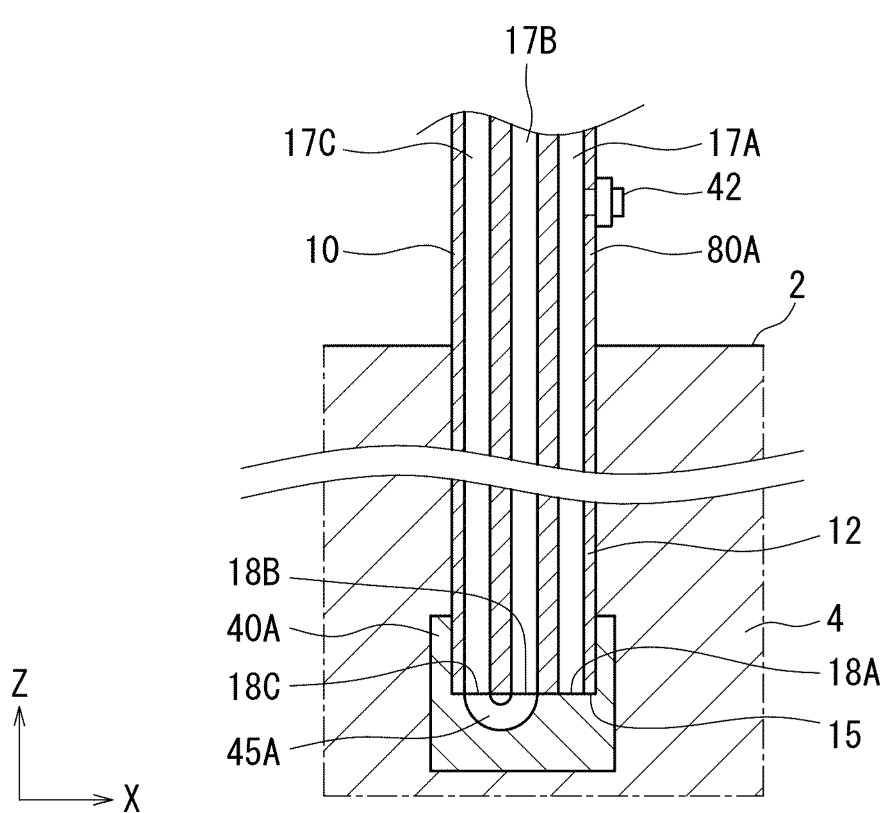
FIG. 16 is a partial cross-sectional view similar to FIG. 8 of the agricultural greenhouse according to the fifth embodiment of the present invention.

Referring to FIGS. 15 and 16, a configuration of the agricultural greenhouse 1 according to a fifth embodiment is different from that of the first embodiment in the following points. Other configurations of the fifth embodiment are similar to those of the first embodiment, and the same or similar elements as those of the first embodiment are denoted by the same reference numerals.

Referring to FIG. 15, the pillar member 80A includes a buried portion 12A extended beyond the ground 2 and is buried in the ground 4. In addition, the pillar member 80B includes a buried portion 12B extended beyond the ground 2 and is buried in the ground 4. The length L2 of the buried portions 12A and 12B is arbitrary, but is preferably 10 m or more.

Referring also to FIG. 16, the inlet 42 of the pillar member 80A is not provided in the lid portion 40A, but is provided above the ground 2 of the pillar member main body 10. The lid portion 40A does not have the inlet/outlet flow channel 46A (shown in FIG. 5). That is, the first opening 18A of the first flow channel 17A is sealed by the lid portion 40A. Therefore, when the heating medium circulates in the agricultural greenhouse 1, the heating medium is accumulated between the first end portion 15 of the first flow channel 17A of the pillar member 80A and the inlet 42, and the heating medium does not flow. The heating medium flowing into the pillar member 80A flows through the first flow channel 17A from the inlet 42 toward the second end portion 16.

Although not illustrated, the pillar member 80B has a similar configuration. That is, the heating medium is accumulated between the second end portion 16 of the first flow channel 17C of the pillar member 80B and the outlet 43, and the heating medium does not flow. The heating medium flowing into the pillar member 80B flows through the first flow channel 17C from the first end portion 15 toward the outlet 43.

According to the agricultural greenhouse 1 of the fifth embodiment, it is possible to use the heating medium using the underground heat obtained through the buried portions 12A and 12B in addition to the heat from the sunlight. In particular, in winter, since the underground temperature is higher than the air temperature, the inside of the agricultural greenhouse 1 can be warmed using the underground heat.

Sixth Embodiment

Referring to FIGS. 17 to 22, a configuration of an agricultural greenhouse 1 according to a sixth embodiment is different from that of the first embodiment in the following points. Other configurations of the sixth embodiment are similar to those of the first embodiment, and the same or similar elements as those of the first embodiment are denoted by the same reference numerals.

In the pillar member 80A according to the present embodiment, the pillar member main body 10 has the same structure as that of the first embodiment (see FIGS. 3 and 4), while the pair of lid portions 40A and 40B has a structure different from that of the first embodiment. Therefore, the flow channel structure of the heating medium in the pillar member 80A is also different from that of the first embodiment.

Figures 18, 19:
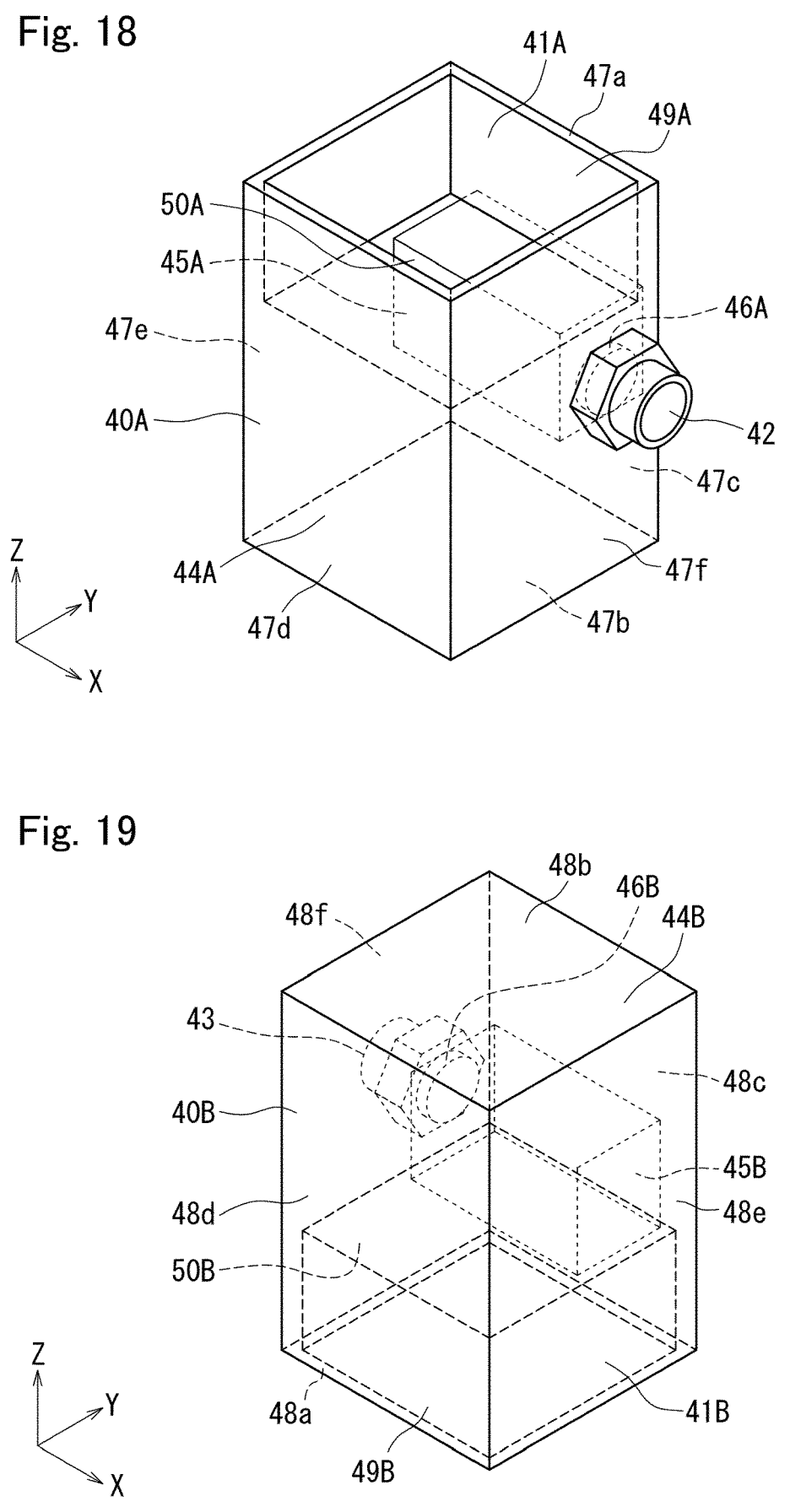

Referring to FIG. 18, the base portion 44A of the lid portion 40A is provided with a common flow channel 45A and an inlet/outlet flow channel 46A. The common flow channel 45A is constituted by a groove recessed from the contact surface 50A of the recess 41A toward the bottom surface 47*b*. The opening 51D of the inlet/outlet flow channel 46A is aligned with the inlet 42 as in the first embodiment, while the opening 51C is open to the common flow channel 45A.

Referring to FIG. 19, the lid portion 40B is configured similarly to the lid portion 40A. The base portion 44B of the lid portion 40B is provided with a common flow channel 45B and an inlet/outlet flow channel 46B. The common flow channel 45B includes a groove recessed from the contact surface 50B of the recess 41B toward the bottom surface 48*b*. The opening 52D of the inlet/outlet flow channel 46B is aligned with the outlet 43 as in the first embodiment, while the opening 52C is open to the common flow channel 45B.

Figure 17:
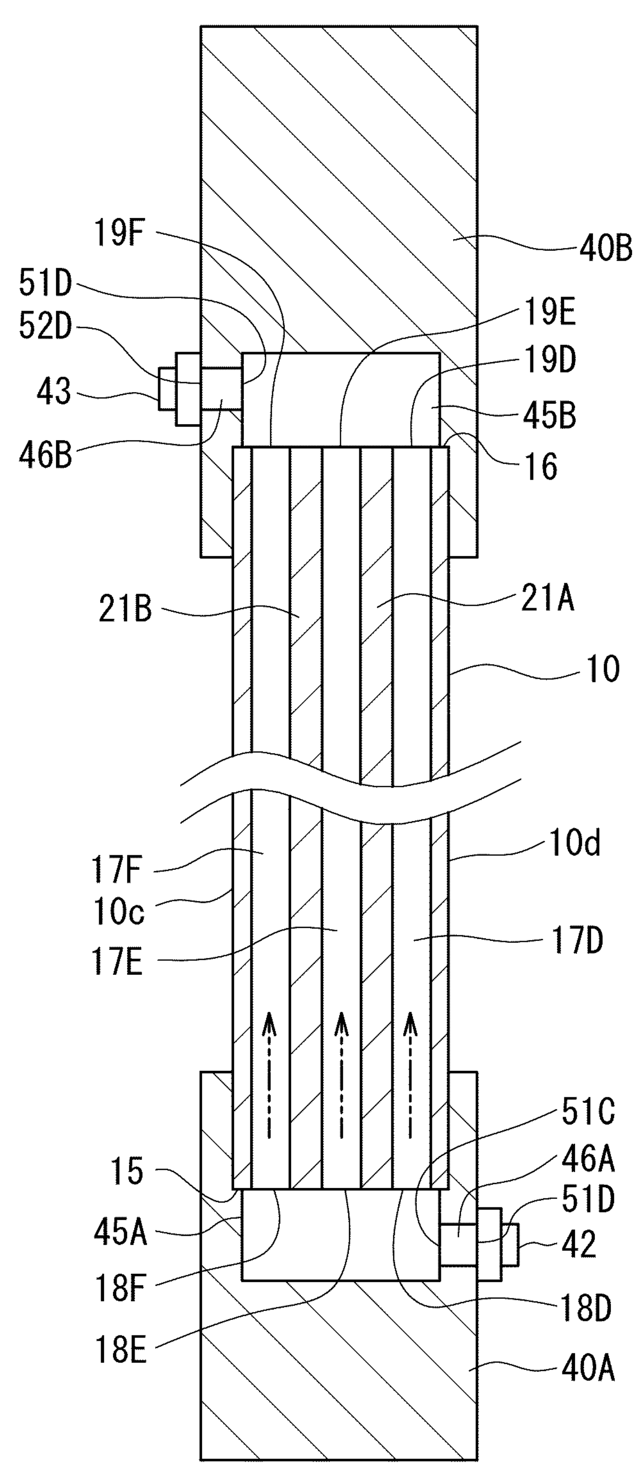
FIG. 17 is a partial cross-sectional view similar to FIG. 5 of the agricultural greenhouse according to a sixth embodiment of the present invention.
Figure 17:
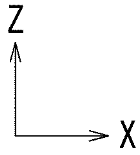

Referring to FIG. 17, the first end portion 15 of the pillar member main body 10 is fitted into the recess 41A of the lid portion 40A and comes into contact with the contact surface 50A, and the second end portion 16 of the pillar member main body 10 is fitted into the recess 41B of the lid portion 40B and comes into contact with the contact surface 50B. The hollow portion 20 of the pillar member main body 10 is constituted by three elongated holes arranged adjacent to each other with partition walls 21A and 21B interposed therebetween, and each of the elongated holes has first openings 18D, 18E, and 18F opened at the first end portion 15 and second openings 19D, 19E, and 19F opened at the second end portion 16. All of the first openings 18D, 18E, and 18F communicate with the common flow channel 45A of the lid portion 40A. All of the second openings 19D, 19E, and 19F communicate with the common flow channel 45B of the lid portion 40B.

The heating medium flowing in from the inlet 42 flows into the common flow channel 45A via the inlet/outlet flow channel 46A of the lid portion 40A. The heating medium flows into the three elongated holes from the common flow channel 45A through the three first openings 18D, 18E, and 18F. The heating medium flows from the first end portion 15 toward the second end portion 16 in each of the three elongated holes. That is, all of these elongated holes serve as the first flow channels 17D, 17E, and 17F through which the heating medium flows from the first end portion 15 toward the second end portion 16. The heating medium in each of the first flow channels 17D, 17E, and 17F joins at the common flow channel 45B of the lid portion 40B via the second openings 19D, 19E, and 19F. The heating medium flows from the common flow channel 45B toward the outlet 43 via the inlet/outlet flow channel 46B and flows out from the outlet 43.

Unlike the first embodiment in which the heating medium flows in a meandering manner, in the present embodiment, the pillar member 40 does not include the second flow channel (for example, the flow channel 17B illustrated in FIG. 5) through which the heating medium flows from the second end portion 16 where the outlet 43 is disposed toward the first end portion 15 where the inlet 42 is disposed. The hollow portion 20 of the pillar member main body 10 is a plurality of first flow channels 17D, 17E, and 17F connected in parallel to the common flow channels 44A and 45B. The heating medium is delivered into the first flow channels 17D, 17E, and 17F and flows in a one-way manner from the first end portion 15 toward the second end portion 16.

Figure 20:
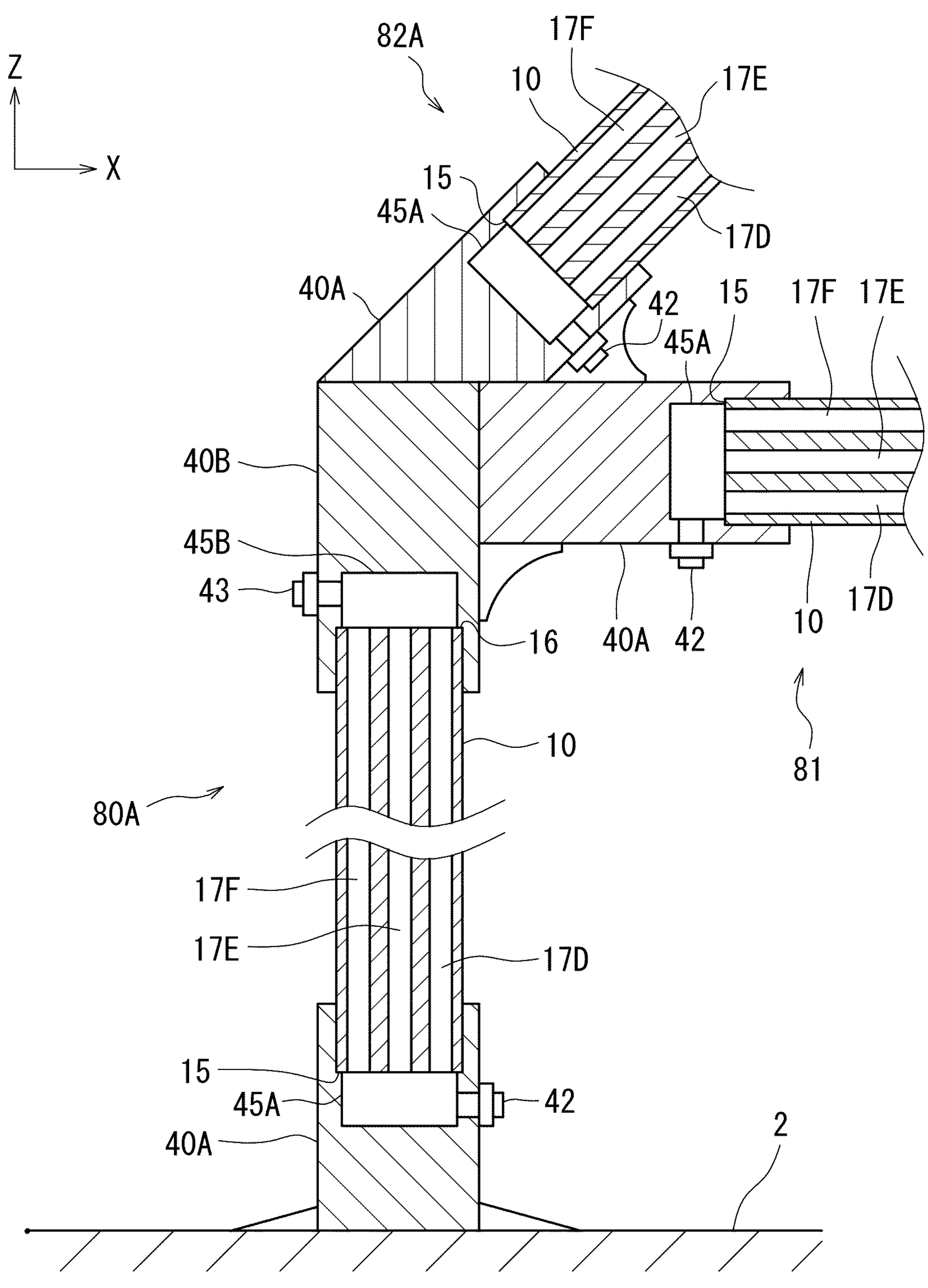
FIG. 20 is a partial cross-sectional view similar to FIG. 8 of the agricultural greenhouse according to the sixth embodiment of the present invention.
Figure 21:
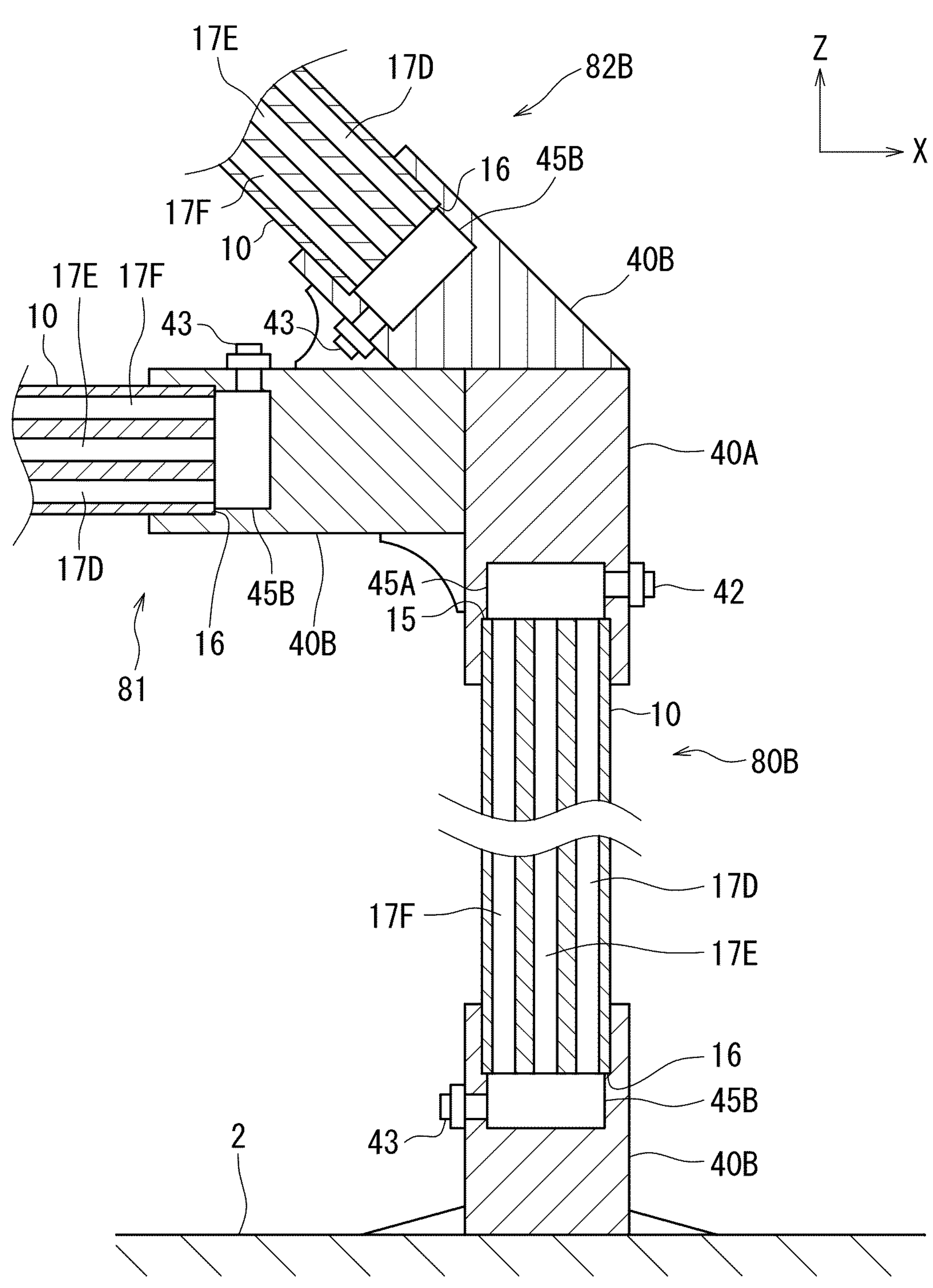
FIG. 21 is a partial cross-sectional view similar to FIG. 9 of the agricultural greenhouse according to the sixth embodiment of the present invention.
Figure 22:
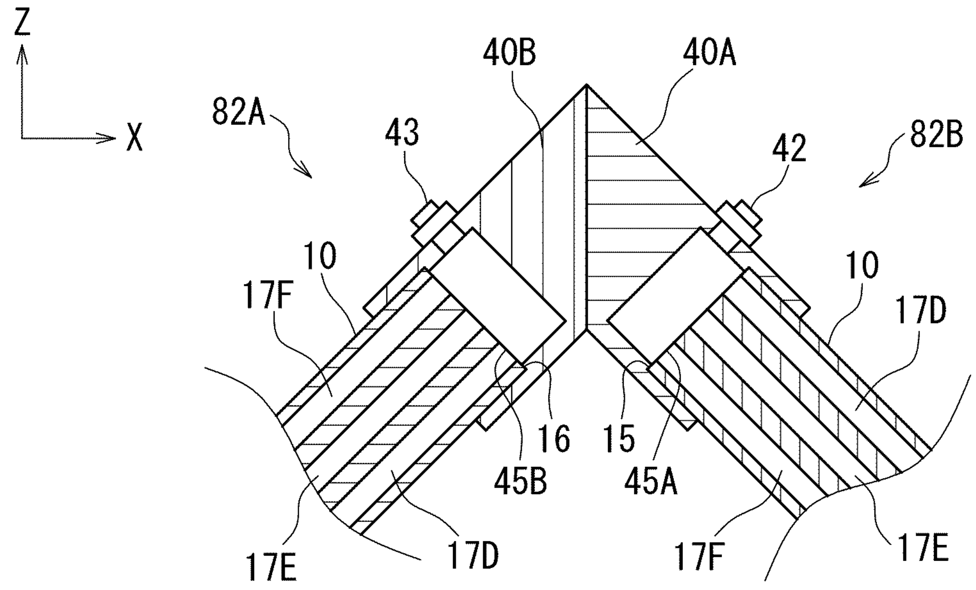
FIG. 22 is a partial cross-sectional view similar to FIG. 10 of the agricultural greenhouse according to the sixth embodiment of the present invention.

As shown in FIGS. 20 to 22, the same applies to other structural members (the beam member 81 and the rafter members 82A and 82B). The beam member 81 and the rafter members 82A and 82B also have first flow channels 17D, 17E, and 17F through which the heating medium flows in a one-way manner from the first end portion 15 toward the second end portion 16.

Also in the present embodiment, it is possible to provide a building that collects heat from sunlight while suppressing an increase in a shadow generation range which is also a cause of a decrease and unevenness in the solar radiation amount in an agricultural greenhouse. Further, since the plurality of first flow channels are connected in parallel and the heating medium flows in a one-way manner, it is easy to ensure the flow rate of the heating medium. When the flow rate increases, the temperature in the greenhouse can be lowered by the heating medium when the temperature in the greenhouse rises excessively, and the heating medium can also be used as an auxiliary device for cooling equipment. In addition, since the residence time of the heating medium is shortened, the load of the pump 59 can be reduced.

Seventh Embodiment

Figure 23:
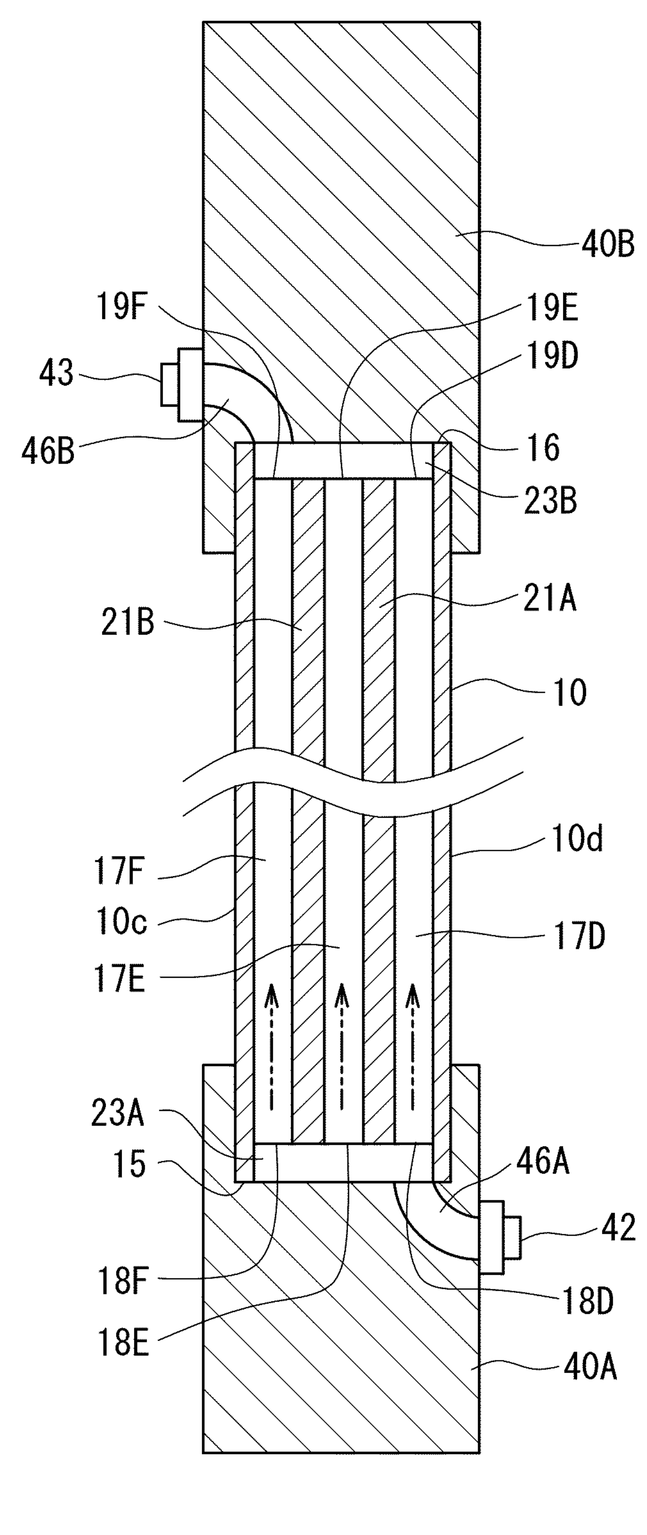
FIG. 23 is a partial cross-sectional view similar to FIG. 12 of the agricultural greenhouse according to a seventh embodiment of the present invention.

Referring to FIG. 23, a configuration of an agricultural greenhouse 1 according to a seventh embodiment is different from that of the first embodiment in the following points. Other configurations of the seventh embodiment are similar to those of the first embodiment, and the same or similar elements as those of the first embodiment are denoted by the same reference numerals.

The difference of the present embodiment from the sixth embodiment is the same as the difference of the second embodiment from the first embodiment. In the present embodiment, the lid portions 40A and 40B are not provided with the common flow channels 45A and 45B (see FIG. 17), and the pillar member main body 10 is provided with the recesses 23A and 23B.

The recess 23A is concave from the end surface of the first end portion 15 toward the second end portion 16. The first openings 18D, 18E, and 18F are opened in the bottom surface 24A of the recess 23A. All of the first flow channels 17D, 17E, and 17F communicate with the recess 23A on the first end portion 15 side. The recess 23B is concave from the end surface of the second end portion 16 toward the first end portion 15. The second openings 19D, 19E, and 19F are opened in the bottom surface 24B of the recess 23B. All of the first flow channels 17D, 17E, and 17F communicate with the recess 23B on the second end portion 16 side. The inlet/outlet flow channel 46A of the lid portion 40A allows the inlet 42 to communicate with the recess 23A. The inlet/outlet flow channel 46B of the lid portion 40B allows the recess 23B to communicate with the outlet 43.

In the present embodiment, the recesses 23A and 23B perform functions equivalent to those of the common flow channels 45A and 45B in the sixth embodiment. That is, the heating medium flows into the recess 23A from the inlet 42 via the inlet/outlet flow channel 46A, is delivered into the plurality of first flow channels 17D, 17E, and 17F from the recess 23A, flows through the first flow channels 17D, 17E, and 17F, joins at the recess 23B, and flows toward the outlet 43 via the inlet/outlet flow channel 46. As a result, the same effects as those of the sixth embodiment can be obtained.

Modification

Figure 24A:
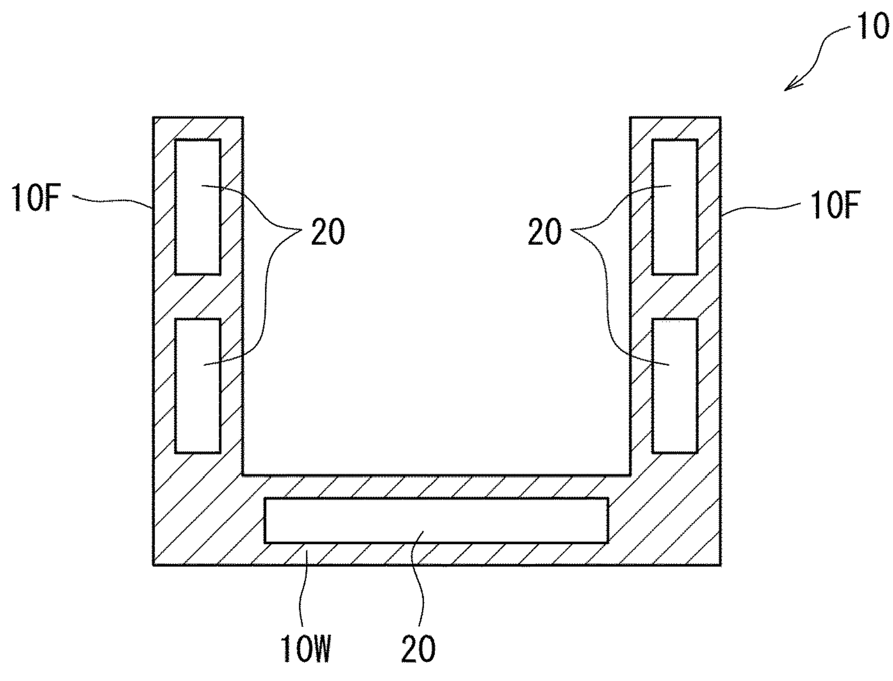
FIG. 24A is a cross-sectional view of the structural member similar to FIG. 4 according to a first modification of the present invention.
Figure 24B:
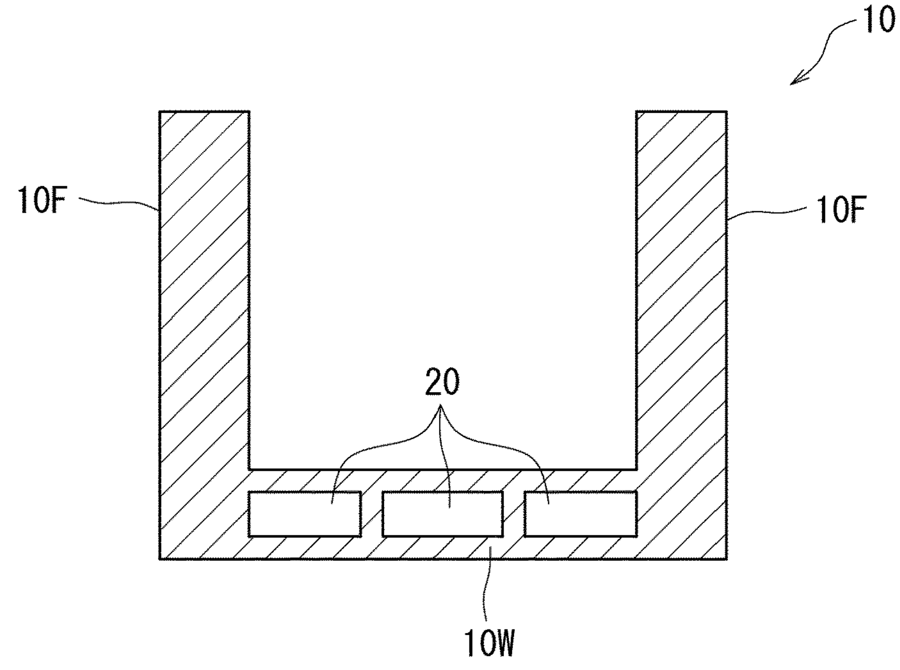
FIG. 24B is a cross-sectional view of the structural member similar to FIG. 4 according to a second modification of the present invention.
Figure 25A:
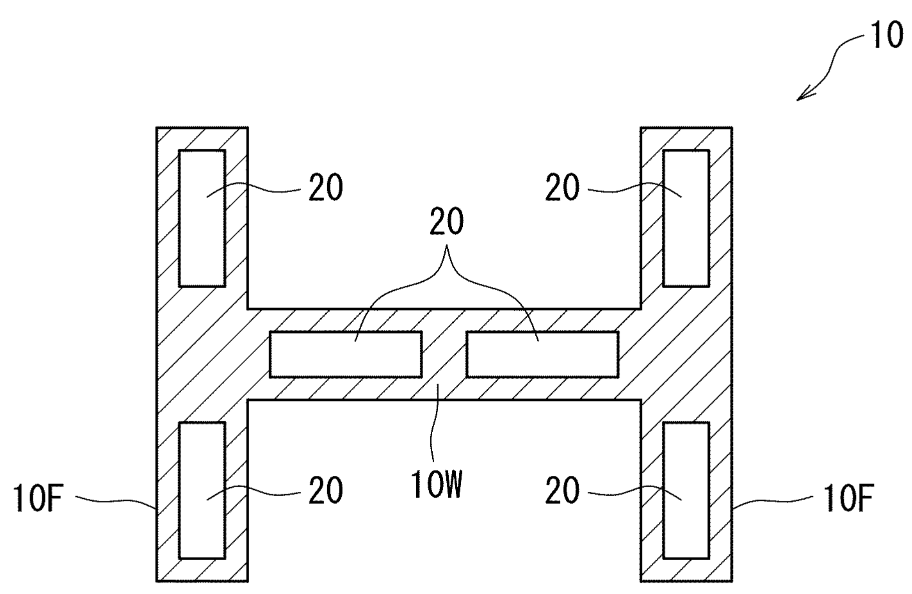
FIG. 25A is a cross-sectional view of a structural member similar to FIG. 4 according to a third modification of the present invention.
Figure 25B:
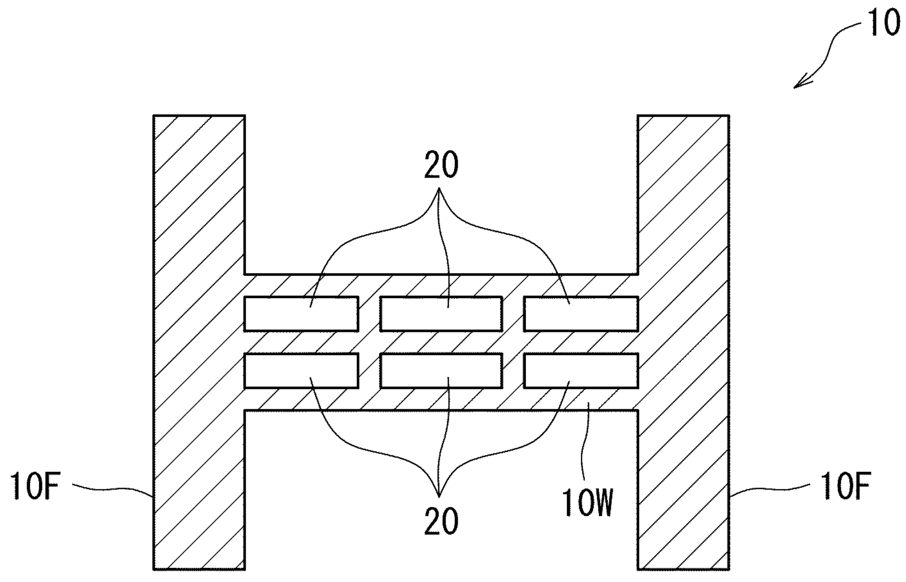
FIG. 25B is a cross-sectional view of a structural member similar to FIG. 4 according to a fourth modification of the present invention.

In the above embodiment, the structural member main body has a rectangular cross section, but the cross-sectional shape of the structural member main body is not particularly limited. As shown in FIGS. 24A and 24B, the pillar member main body 10 may have a C-shaped or U-shaped cross section. As shown in FIGS. 25A and 25B, the pillar member main body 10 may have an H-shaped cross section. The material is not limited to the aluminum alloy, and may be another metal material such as steel, aluminum, copper, a copper alloy, or silver. The main bodies of other structural members (for example, the beam member and the rafter member) can be modified in the same manner.

Referring to FIGS. 24A and 24B, the C-shaped pillar member main body 10 includes a web 10W and a pair of flanges 10F and 10F extending perpendicularly from both end portions of the web 10W, and has a C-shaped cross section as a whole. The hollow portion 20 (a plurality of elongated holes) is provided in at least one of the three portions of the web 10W and the pair of flanges 10F. The hollow portion 20 may be provided in all of the three portions as illustrated in FIG. 24A, or may be provided only in the web 10W as illustrated in FIG. 24B. The number of elongated holes provided in each of the three portions is not particularly limited. In the case of the meandering type as in the first embodiment, the total number of elongated holes may be an odd number of three or more, and in the case of the one-way type as in the sixth embodiment, the total number of elongated holes may be plural.

Referring to FIGS. 25A and 25B, the H-shaped pillar member main body 10 includes a web 10W and a pair of flanges 10F extending perpendicularly from both end portions of the web 10W, and has a H-shaped cross section as a whole. The portion where the hollow portion 20 is provided and the number of elongated holes constituting the hollow portion 20 are the same as those of the above-described C-shaped pillar member main body 10. As illustrated in FIG. 25B, the elongated holes may be arranged side by side in the plate thickness direction of the web 10W.

EXPLANATION OF REFERENCES

1 Agricultural greenhouse (building)
2 Ground
4 Underground
10 Pillar member main body (structural member main body)
10*a* Surface (light-receiving surface)
10*b*, 10*c*, 10*d* Surface
11 Cavity
12A, 12B Buried portion
15 First end portion
16 Second end portion
17A, 17C First flow channel
17B Second flow channel
18A, 18B, 18C First opening
19A, 19B, 19C Second opening
20 Hollow portion
21A, 21B Partition wall
22A, 22B Liquid passage hole
30 Rib
36 Black film
37A, 37B, 37C Heat insulating material
40A, 40B Lid portion
41A, 41B Recess
42 Inlet
43 Outlet
44A, 44B Base portion
45A, 45B Connection flow channel
46A, 46B Inlet/outlet flow channel
47*a* Top surface
47*b* Bottom surface
47*c*, 47*d*, 47*e*, 47*f* Side surface
48*a* Top surface
48*b* Bottom surface
48*c*, 48*d*, 48*e*, 48*f* Side surface
49A, 49B Opening
50A, 50B Contact surface
51A, 51B, 51C, 51D Opening
52A, 52B, 52C, 52D Opening
58 Tank
59 Pump
60 Control unit
61 Radiator
62 Three-way valve
63*a*, 63*b*, 63*c* External pipe
64 Cultivation space
65 Upper space
66*a*, 66*b*, 66*c*, 66*d*, 66*e*, 66*f* Pipe
80A, 80B Pillar member (structural member)
81 Beam member (structural member)
82A, 82B Rafter member (structural member)
83 Connecting member
90 Connection lid portion
91 Lid portion flow channel
92 Screw

The invention claimed is:

1. A building comprising at least one structural member, the structural member including:

a structural member main body that is formed by extrusion or casting of a metal, includes a light-receiving surface irradiated with sunlight, and is internally formed with a hollow portion extending from a first end portion toward a second end portion, a pair of lid portions that are respectively disposed at the first end portion and the second end portion, and close the hollow portion, an inlet that is provided in any one of the pair of lid portions and through which a heating medium flows into the hollow portion, and an outlet that is provided in any one of the pair of lid portions and through which the heating medium flows out from the hollow portion, wherein the hollow portion includes a first flow channel through which the heating medium flows from the first end portion toward the second end portion, and a second flow channel that is disposed so as to be adjacent to the first flow channel with a partition wall interposed between the first flow channel and the second flow channel and through which the heating medium flows from the second end portion toward the first end portion.

2. The building according to claim 1, wherein each of the pair of lid portions is provided with a connection flow channel connecting the first flow channel and the second flow channel such that the heating medium flows in a meandering manner from the inlet toward the outlet.

3. The building according to claim 1, wherein the structural member main body includes a liquid passage hole provided in the partition wall and connecting the first flow channel and the second flow channel such that the heating medium flows in a meandering manner from the inlet toward the outlet.

4. The building according to claim 1, wherein the structural member main body is provided with a rib along a direction in which the hollow portion extends.

5. The building according to claim 1, wherein the light-receiving surface is coated with a black film.

6. The building according to claim 1, wherein a heat insulating material is disposed on an outer surface of the structural member main body except the light-receiving surface.

7. The building according to claim 1, wherein the structural member is a pillar member fixed to the ground and extending in a vertical direction.

8. The building according to claim 7, wherein the structural member includes a buried portion extended beyond the ground and buried in the ground.

9. The building according to claim 1, wherein the structural member is a beam member extending in a lateral direction.

10. The building according to claim 1, wherein the structural member is a pair of rafter members extending in oblique directions and connected to each other.

11. A building comprising at least one structural member, the structural member including:

a structural member main body that is formed by extrusion or casting of a metal, includes a light-receiving surface irradiated with sunlight, and is internally formed with a hollow portion extending from a first end portion toward a second end portion, a pair of lid portions that are respectively disposed at the first end portion and the second end portion, and close the hollow portion, an inlet that is provided in any one of the pair of lid portions and through which a heating medium flows into the hollow portion, and an outlet that is provided in any one of the pair of lid portions and through which the heating medium flows out from the hollow portion, wherein the hollow portion includes a plurality of first flow channels disposed so as to be adjacent to each other with a partition wall interposed between the plurality of first flow channels and through which the heating medium flows from the first end portion toward the second end portion.

12. The building according to claim 11, wherein each of the pair of lid portions is provided with a common flow channel communicating with each of opening ends of the plurality of first flow channels such that the heating medium is delivered from the inlet to the plurality of first flow channels, and the heating medium merges from the plurality of first flow channels and flows toward the outlet.

13. The building according to claim 11, wherein the structural member main body includes a recess provided at the first end portion and the second end portion and allowing end portions of the plurality of first flow channels to communicate with each other, and each of the pair of lid portions is provided with an inlet/outlet flow channel allowing the inlet or the outlet to communicate with the recess.

14. The building according to claim 11, wherein the structural member main body is provided with a rib along a direction in which the hollow portion extends.

15. The building according to claim 11, wherein the light-receiving surface is coated with a black film.

16. The building according to claim 11, wherein a heat insulating material is disposed on an outer surface of the structural member main body except the light-receiving surface.

17. The building according to claim 11, wherein the structural member is a pillar member fixed to the ground and extending in a vertical direction.

18. The building according to claim 17, wherein the structural member includes a buried portion extended beyond the ground and buried in the ground.

19. The building according to claim 11, wherein the structural member is a beam member extending in a lateral direction.

20. The building according to claim 11, wherein the structural member is a pair of rafter members extending in oblique directions and connected to each other.

* * * * *